(12) United States Patent
Lee et al.

(10) Patent No.: US 10,818,913 B2
(45) Date of Patent: Oct. 27, 2020

(54) NEGATIVE ELECTRODE FOR METAL BATTERY, METAL BATTERY COMPRISING THE SAME, AND METHOD OF PREPARING THE NEGATIVE ELECTRODE FOR METAL BATTERY

(71) Applicants: Samsung Electronics Co., Ltd., Suwon-si (KR); Samsung SDI Co., Ltd., Gyeonggi-do (KR)

(72) Inventors: Yonggun Lee, Suwon-si (KR); Saebom Ryu, Suwon-si (KR); Toshinori Sugimoto, Hwaseong-si (KR); Dongmin Im, Seoul (KR); Wonseok Chang, Seoul (KR)

(73) Assignees: SAMSUNG ELECTRONICS CO, LTD., Gyeonggi-Do (KR); SAMSUNG SDI CO, LTD., Gyeonggi-Do (KR)

( * ) Notice: Subject to any disclaimer, the term of this patent is extended or adjusted under 35 U.S.C. 154(b) by 148 days.

(21) Appl. No.: 16/102,162

(22) Filed: Aug. 13, 2018

(65) Prior Publication Data
US 2019/0190005 A1    Jun. 20, 2019

(30) Foreign Application Priority Data
Dec. 18, 2017 (KR) .................. 10-2017-0174161

(51) Int. Cl.
*H01M 4/134*    (2010.01)
*H01M 10/052*    (2010.01)
(Continued)

(52) U.S. Cl.
CPC ............ *H01M 4/134* (2013.01); *H01M 2/16* (2013.01); *H01M 4/0404* (2013.01);
(Continued)

(58) Field of Classification Search
None
See application file for complete search history.

(56) References Cited

U.S. PATENT DOCUMENTS

| 2005/0100787 | A1* | 5/2005 | Morioka | C07D 241/44 |
| | | | | 429/213 |
| 2017/0324097 | A1* | 11/2017 | Lee | H01M 4/134 |
| 2018/0316051 | A1 | 11/2018 | Lee et al. | |

FOREIGN PATENT DOCUMENTS

| CN | 103956516 B | 3/2016 |
| KR | 1020140048364 A | 4/2014 |

(Continued)

OTHER PUBLICATIONS

Cheng et al., "Supramolecular assembly-mediated lithium ion transport in nanostructured solid electrolytes*", RSC Advances, 6, 2016, pp. 38223-38227.

(Continued)

*Primary Examiner* — Karie O'Neill Apicella
(74) *Attorney, Agent, or Firm* — Cantor Colburn LLP

(57) ABSTRACT

A negative electrode for a metal battery, the negative electrode a metal substrate; and a protective layer disposed directly on at least a portion of the metal substrate, wherein the protective layer comprises an ion-conductive oligomer, wherein the ion-conductive oligomer comprises an ion-conductive structural unit in at least one of a main chain and a side chain of the an ion-conductive oligomer, and at least two hydrogen-bond-forming functional groups at different ends of the ion-conductive oligomer, and wherein the protective layer has a thickness of 5 micrometers or less.

23 Claims, 11 Drawing Sheets

(51) Int. Cl.

| | |
|---|---|
| *H01M 10/0569* | (2010.01) |
| *H01M 2/16* | (2006.01) |
| *H01M 4/04* | (2006.01) |
| *H01M 10/0565* | (2010.01) |
| *H01M 4/1395* | (2010.01) |
| *H01M 4/62* | (2006.01) |
| *H01M 4/36* | (2006.01) |
| *H01M 4/38* | (2006.01) |
| *H01M 10/42* | (2006.01) |
| *H01M 4/02* | (2006.01) |

(52) U.S. Cl.
CPC ......... *H01M 4/1395* (2013.01); *H01M 4/366* (2013.01); *H01M 4/382* (2013.01); *H01M 4/62* (2013.01); *H01M 10/052* (2013.01); *H01M 10/0565* (2013.01); *H01M 10/0569* (2013.01); *H01M 10/4235* (2013.01); *H01M 2004/021* (2013.01); *H01M 2004/027* (2013.01); *H01M 2004/028* (2013.01); *H01M 2300/0082* (2013.01)

(56) References Cited

FOREIGN PATENT DOCUMENTS

| KR | 1020140112597 A | 9/2014 |
|---|---|---|
| KR | 1020140127442 A | 11/2014 |
| KR | 1020170050660 A | 5/2017 |
| RU | 2524963 C1 | 3/2013 |
| WO | 2002040594 A1 | 5/2002 |

OTHER PUBLICATIONS

Zheng et al., "High Performance Lithium Metal Negative Electrode with a Soft and Flowable Polymer Coating", ACS Energy Letters, 2016, pp. 1247-1255.
Cordier et al., "Self-healing and thermoreversible rubber from supramolecular assembly", Nature, vol. 451, 2008, pp. 977-980.
Jeon et al., "Supramolecular electrolytes with multiple hydrogen bonds for solid state dye-sensitized solar cells", Journal of Photochemistry and Photobiology A: Chemistry 212, 2010, pp. 88-93.
Kim et al., "Supramolecular Electrolytes for Use in Highly Efficient Dye-Sensitized Solar Cells**", Adv. Mater. 16, No. 19, 2004, 1753-1757.
Kim et al., Adv. Mater. 2004, 16,No. 19, Oct. 4, p. 1-7.
Lee et al., "Dendrite-Free Lithium Deposition for Lithium Metal Anodes with Interconnected Microsphere Protection", Chemistry of Materials, 29, 2017, pp. 5906-5914.
Liang et al., "Preparation and Properties of Polybenzimidazole-Lithium Salt-Poly(ethylene glycol) Monomethyl Ether Blend All Solid Polymer Electrolyte", Journal of Functional Polymers, vol. 30, No. 2, 2017, pp. 168-174.
Liu et al., "Lithium Metal Anodes with an Adaptive "Solid-Liquid" Interfacial Protective Layer", Journal of the American Chemical Society, 139, 2017, pp. 4815-4820.
Qian et al., "Anode-Free Rechargeable Lithium Metal Batteries", Advanced Functional Materials, 26, 2016, pp. 7094-7102.
Rao Chinnam et al., "Blends of Pegylated Polyoctahedralsilsesquioxanes (POSS-PEG) and Methyl Cellulose as Solid Polymer Electrolytes for Lithium Batteries", Electrochimica Acta, 2015, pp. 1-21.
Wang et al., "Self-healing chemistry enables the stable operation of silicon microparticle anodes for high-energy lithium-ion batteries", Nature Chemistry, vol. 5, 2013, pp. 1042-1048.
J. Qian et al., "High rate and stable cycling of lithium metal anode", Nature Communications, 6, 6362, 2015, 1-9.

* cited by examiner

NEGATIVE ELECTRODE FOR METAL BATTERY, METAL BATTERY COMPRISING THE SAME, AND METHOD OF PREPARING THE NEGATIVE ELECTRODE FOR METAL BATTERY

CROSS-REFERENCE TO RELATED APPLICATION

This application claims priority to and the benefit of Korean Patent Application No. 10-2017-0174161, filed on Dec. 18, 2017, in the Korean Intellectual Property Office, and all the benefits therefrom under 35 U.S.C. § 119, the content of which is incorporated herein in its entirety by reference.

BACKGROUND

1. Field

The present disclosure relates to a negative electrode for a metal battery, a metal battery including the same, and methods of preparing the negative electrode for a metal battery.

2. Description of the Related Art

A metal battery, for example, a lithium metal battery, includes a lithium metal thin film as a negative electrode. Due to the high reactivity of lithium, a lithium metal thin film is highly reactive with a liquid electrode during charge and discharge.

In addition, dendrites may form on a lithium negative electrode included in a lithium metal battery, thereby deteriorating coulombic efficiency, lifespan characteristics, thermal stability, or electrochemical stability of the lithium metal battery.

Thus, there is still a need to develop an improved negative electrode for a metal battery, a metal battery including the same, and a method of preparing the negative electrode for a metal battery.

SUMMARY

Provided is a negative electrode for a metal battery.

Provided is a metal battery including the negative electrode.

Provided are methods of preparing the negative electrode for a metal battery.

Additional aspects will be set forth in part in the description which follows and, in part, will be apparent from the description, or may be learned by practice of the presented embodiments.

According to an aspect of an embodiment, a negative electrode for a metal battery includes: a metal substrate; and a protective layer disposed directly on at least a portion of the metal substrate, wherein the protective layer includes an ion-conductive oligomer, wherein the ion-conductive oligomer includes an ion-conductive structural unit in at least one of a main chain and a side chain of the ion-conductive oligomer, and at least two hydrogen-bond forming functional groups at different ends of the ion-conductive oligomer, and wherein the protective layer has a thickness of 5 micrometers or less.

According to an aspect of another embodiment, a metal battery includes a positive electrode; the negative electrode, and an electrolyte disposed between the positive electrode and the negative electrode.

According to an aspect of another embodiment, a method of preparing a negative electrode for a metal battery includes: providing a protective layer forming composition including an ion-conductive oligomer; applying, on at least a portion of a metal substrate, the protective layer forming composition to form a coating; and drying the coating to prepare the negative electrode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
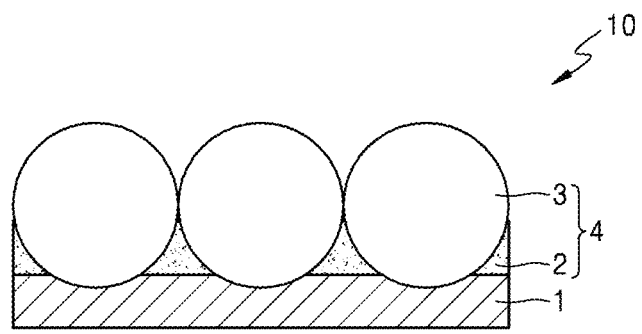
FIG. 1 is a schematic diagram of a structure of a negative electrode including a protective layer, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The C rate is a discharge rate of a cell, and is obtained by dividing a total capacity of the cell by a total discharge period of time of 1 hour, e.g., a C rate for a battery having a discharge capacity of 1.6 ampere-hours would be 1.6 amperes.

Hereinafter, a negative electrode for a metal battery, a metal battery including the same, and a method of preparing the negative electrode for a metal battery according to example embodiments will be described in further detail with reference to the drawings.

Throughout the specification, the term "include" in relation to an element does not preclude other elements but may further include another element, unless otherwise stated.

A metal battery, for example, a lithium metal battery, includes a lithium metal thin film, as a negative electrode, and a liquid electrolyte. Examples of the liquid electrolyte may include an ether-based organic solvent and a lithium salt.

The ether-based organic solvent is very stable with respect to the lithium metal thin film when compared with a carbonate-based solvent. However, the ether-based organic solvent cannot inhibit a growth of dendrite on the lithium metal thin film. Although a high concentration of a lithium salt is introduced to prevent the growth of dendrite, there are limitations in preventing the growth of dendrite.

Thus, the present inventors have proposed a negative electrode for a metal battery to prevent the growth of dendrite.

A negative electrode for a metal battery according to an embodiment comprises a metal substrate and a protective layer disposed directly on at least one portion of the metal substrate. The protective layer comprises an ion-conductive oligomer, and the ion-conductive oligomer comprises an ion-conductive structural unit in at least one of a main chain and a side chain of the ion-conductive oligomer, and at least two hydrogen-bond forming functional groups disposed at different ends of the ion-conductive oligomer. The protective layer may have a thickness of 5 µm or less.

The metal substrate may include lithium metal, a lithium metal alloy, or a combination thereof.

The lithium metal alloy may comprise lithium metal and a metal/metalloid alloyable with lithium metal or an oxide thereof. The metal/metalloid alloyable with lithium metal or the oxide thereof may be Si, Sn, Al, Ge, Pb, Bi, Sb, an Si—Y' alloy (where Y' is alkali metal, alkali earth metal, Group XIII element, Group XIV element, transition metal, rear earth element, or a combination thereof (except for Si), an Sn—Y' alloy (where Y' is alkali metal, alkali earth metal, elements of Group XIII to Group XVI, transition metal, rear earth element, or a combination thereof (except for Sn), MnO ($0<x\leq2$), or the like.

The element Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof. For example, the oxide of the metal/metalloid alloyable with lithium metal may be lithium titanium oxide, vanadium oxide, lithium vanadium oxide, $SnO_2$, $SiO_x$ ($0<x<2$), or the like.

The metal substrate may be a conductive metal substrate. The conductive metal substrate may comprise stainless steel, copper, nickel, iron, cobalt, or a combination thereof. In addition, the metal substrate may have various structures such as a structure in which a surface of an insulating substrate is coated with a conductive metal. In addition, the metal substrate may be a flexible conductive metal substrate.

The metal substrate may have a thickness of 100 μm or less, for example, 80 μm or less, or 50 μm or less, or 30 μm or less, or 1 to 100 μm, 2 to 80 μm, or 4 to 50 um.

The negative electrode for a metal battery according to an embodiment has a structure in which the protective layer is disposed directly on the metal substrate and may include an ion-conductive oligomer.

Since the ion-conductive oligomer includes the ion-conductive structural unit at one or more of the main chain and the side chain, interfacial resistance between the negative electrode and the electrolyte may be reduced, thereby increasing ionic conductivity at room temperature and an elevated temperature, e.g., 60° C.

The ion-conductive oligomer may include at least two hydrogen-bond forming functional groups at different ends. A hydrogen bond is a strong intermolecular attraction generated when a hydrogen atom is introduced between two highly electronegative atoms such as oxygen (O), nitrogen (N), and fluorine (F) and may be represented by X—H ⋯⋯⋯ Y, wherein Y may be an oxygen atom, a nitrogen atom, or a fluorine atom. The protective layer may have both flexibility and mechanical strength due to hydrogen bonds formed on the surface of the metal substrate. The protective layer may also be a self-assembled protective layer due to the hydrogen bonds. Also, thermal stability of the protective layer may be enhanced. A negative electrode including the protective layer may have improved charging and discharging characteristics, such as improved coulombic efficiency and lifespan characteristics.

The thickness of the protective layer may be 5 (micrometers) μm or less. For example, the thickness of the protective layer may be 4 μm or less, 3 μm or less, or 2 μm or less, or 0.1 to 5 μm, 0.5 to 4 μm, or 1 to 3 μm. The protective layer in the form of a thin film as described above may have improved thermal stability and mechanical properties with enhanced ionic conductivity.

The protective layer may be a solid protective layer. The protective layer may be a solid protective layer disposed directly on the metal substrate. The protective layer may be in the form of a solid film which inhibits the growth of a lithium dendrite on the surface of the metal substrate, e.g., the lithium metal substrate.

The protective layer may have a young's modulus of 50 MPa or greater. The young's modulus of the protective layer may be in the range of about 50 MPa to about 100 MPa. The young's modulus of the protective layer is about 5 to 10 times greater than that of a protective layer formed of polyethylene glycol or polyethylene oxide. The protective layer may have flexibility capable of inhibiting volume change of the negative electrode and mechanical strength capable of suppressing the growth of dendrite formed on the surface of the metal substrate, e.g., lithium metal substrate. Also, the protective layer may increase electrodeposition density of lithium during charging and discharging.

A melting point of the protective layer may be greater than 60° C. The melting point of the protective layer is higher than a melting point of a protective layer formed of polyethylene glycol or polyethylene oxide by about 5 to about 10° C. The protective layer may have enhanced thermal stability.

The main chain or the side chain of the ion-conductive oligomer may be a C1-C30 alkylene oxide group, —{Si(R)(R$_1$)—O—}—, —(CH$_2$CH$_2$O)—{Si(R)(R$_1$)—O—}—, or —{CH(R$_2$)C(R$_3$)COO(R$_4$)}—, wherein R, R$_1$, R$_2$, R$_3$, and R$_4$ may be each independently a hydrogen atom or a C1-C10 alkyl group. For example, the main chain or the side chain of the ion-conductive oligomer may be a C1-C30 alkylene oxide group, —{Si(R)(R$_1$)—O—}—, or —(CH$_2$CH$_2$O)—{Si(R)(R$_1$)—O—}—. For example, the main chain or the side chain of the ion-conductive oligomer may be a C1-C30 alkylene oxide group.

The ion-conductive structural unit may be a C1-C20 alkylene oxide group, —{Si(R)(R$_1$)—O—}—, or —(CH$_2$CH$_2$O)—{Si(R)(R$_1$)—O—}—, wherein R and R$_1$ may be each independently a hydrogen atom or a C1-C10 alkyl group. For example, the ion-conductive structural unit may be a C1-C20 alkylene oxide group. The ion-conductive structural unit may be bound to the main chain or the side chain in various forms, for example, a substituent of the main chain or in a form grafted to the side chain.

The hydrogen-bond forming functional group may be a substituted or unsubstituted pyrimidinone, a substituted or unsubstituted pyrimidinol, a substituted or unsubstituted pyrimidine, a substituted or unsubstituted triazine, a substituted or unsubstituted pyridyl, a substituted or unsubstituted benzimidazole, a substituted or unsubstituted naphthyridine, a substituted or unsubstituted purinone, or a combination thereof.

For example, the hydrogen-bond forming functional group may be a substituted or unsubstituted 4(3H)-pyrimidinone, a substituted or unsubstituted 2(1H)-pyrimidinone, a substituted or unsubstituted 4(1H)-pyrimidinone, a substituted or unsubstituted 4-pyrimidinol, a substituted or unsubstituted 6-pyrimidinol, a substituted or unsubstituted pyrimidine, a substituted or unsubstituted 1,3,5-triazine, a substituted or unsubstituted pyridyl, a substituted or unsubstituted benzimidazole, a substituted or unsubstituted naphthyridine, a substituted or unsubstituted 6(7H)-purinone, a substituted or unsubstituted 6(1H)-purinone, or a combination thereof. For example, the hydrogen-bond forming functional group may be a substituted or unsubstituted 6(7H)-purinone, cytosine, guanine, or a combination thereof.

The term "substituted" used herein indicates that at least one hydrogen atom included in a functional group is substituted with a halogen atom, a C1-C10 alkyl group substituted with a halogen atom (e.g.: $CCF_3$, $CHCF_2$, $CH_2F$, and $CCl_3$), a C1-C10 alkoxy group, a C2-C10 alkoxyalkyl group, a hydroxyl group, a nitro group, a cyano group, an amino group, an amidino group, a hydrazine group, a hydrazone group, a carboxyl group or a salt thereof, a sulfonyl group, a sulfamoyl group, a sulfonic acid group or a salt thereof, a phosphoric acid group or a salt thereof, a C1-C10 alkyl group, a C2-C10 alkenyl group, a C2-C10 alkynyl group, a C1-C10 heteroalkyl group, a C6-C20 aryl group, a C6-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group.

The "halogen atom" includes fluorine, bromine, chlorine, and iodine.

The term "alkyl" refers to a completely saturated, branched or unbranched (or straight-chain or linear) hydrocarbon. Examples of the "alkyl" group may be, but are not limited to, methyl, ethyl, n-propyl, isopropyl, n-butyl, isobutyl, sec-butyl, n-pentyl, isopentyl, neopentyl, iso-amyl, n-hexyl, 3-methylhexyl, 2,2-dimethylpentyl, 2,3-dimethylpentyl, or n-heptyl.

The term "alkoxy" refers to alkyl or aryl linked to an oxygen atom.

The term "alkenyl" refers to a branched or unbranched hydrocarbon having at least one carbon-carbon double bond. Examples of the "alkenyl" group may be, but are not limited to, vinyl, allyl, butenyl, isopropenyl, or isobutenyl.

The term "alkynyl" refers to a branched or unbranched hydrocarbon having at least one carbon-carbon triple bond. Examples of the "alkynyl" group may be, but are not limited to, ethynyl, butynyl, isobutynyl, or isopropynyl.

The term "aryl" refers to a carbocyclic aromatic system in which an aromatic ring is fused to at least one carbon ring. Examples of the "aryl" group may be, but are not limited to, phenyl, naphthyl, or tetrahydronaphthyl.

The term "heteroaryl" refers to a monocyclic or bicyclic organic compound including at least one heteroatom selected from N, O, P, and S with the remaining ring atoms being carbon atoms. For example, a heteroaryl group may include 1 to 5 heteroatoms and 5 to 10 ring members. The S or N may be oxidized to have various oxidation states.

Examples of the "heteroaryl" may be, but are not limited to, thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiazolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isooxazol-3-yl, isooxazol-4-yl, isooxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, 2-pyrazine-2-yl, pyrazine-4-yl, pyrazine-5-yl, 2-pyrimidine-2-yl, 4-pyrimidine-2-yl, or 5-pyrimidine-2-yl.

The ion-conductive oligomer may be represented by Formula 1 and may have a weight average molecular weight (Mw) of about 100 g/mol to about 5000 g/mol.

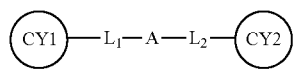

Formula 1

In Formula 1,
In Formula 1, CY1 and CY2 may be each independently a substituted or unsubstituted pyrimidinone, a substituted or unsubstituted pyrimidinol, a substituted or unsubstituted pyrimidine, a substituted or unsubstituted purinone, or a combination thereof,
A may be a C1-C30 alkylene oxide group, —{Si(R)(R$_1$)—O—}$_b$—, or —(CH$_2$CH$_2$O)$_a$—{Si(R)(R$_1$)—O—}$_b$—, wherein R and R$_1$ may be each independently a hydrogen atom or a C1-C10 alkyl group and a and b may be each independently an integer from 1 to 10, L$_1$ and L$_2$ may be each independently a single bond, —CO—, —C(O)O—, —CO—(R')—CO—, —C(O)O—(R'$_1$)—C(O)O—, —CO—(R'$_2$)—C(O)O—, —C(O)O—(R'$_3$)—CO—, —(R'$_4$)—NHCO—, —(R'$_5$)—NHC(O)O—, —(R'$_6$)—NHC(O)O—(R'$_7$), —NCO—(R'$_8$)—NCO—, —NCO—(R'$_9$)—CO—, —NCO—(R'$_{10}$)—C(O)O—, —CO—(R'$_{11}$)—NCO—, —C(O)O—(R'$_{12}$)—NCO—, or a combination thereof, wherein R', R'$_1$, R'$_2$, R'$_3$, R'$_4$, R'$_5$, R'$_6$, R'$_7$, R'$_8$, R'$_9$, R'$_{10}$, R'$_{11}$, and R'$_{12}$ may be each independently a C1-C10 alkylene group, an amino group, or a C1-C10 aminoalkylene group, L$_1$ may be linked to a substituent of CY1, and L$_2$ may be linked to a substituent of CY2. For example, L$_1$ and L$_2$ may be each independently linked to an —NH$_2$ substituent of CY1 and CY2.

Weight average molecular weight used herein may be measured by using any suitable methods known to those skilled in the art. For example, the weight average molecular weight may be measured by gel permeation chromatography (GPC) using polystyrene standards.

The term "substituted" used in Formula 1 is as described above, and detailed descriptions thereof will not be repeated.

The CY1 and CY2 may include Formula 2, Formula 3, or Formula 4 below.

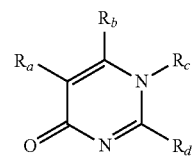

Formula 2

In Formula 2,
R$_a$, R$_b$, R$_c$, and R$_d$ may be each independently a hydrogen atom, a halogen atom, a cyano group, a hydroxyl group, —NH$_2$, —C(=O)R", —C(=O)OR", —OCO(OR"), —C=N(R"), a substituted or unsubstituted C1-C10 alkyl group, a substituted or unsubstituted C1-C10 alkoxy group, a substituted or unsubstituted C2-C10 alkenyl group, a substituted or unsubstituted C2-C10 alkynyl group, a C2-C10 alkylene oxide group, a substituted or unsubstituted C3-C20 cycloalkyl group, a substituted or unsubstituted C6-C20 aryl group, a substituted or unsubstituted C6-C20 aryloxy group, a substituted or unsubstituted C6-C20 heteroaryl group, or a combination thereof, wherein R" may be a hydrogen atom, a C1-C10 alkyl group, or a C6-C20 aryl group, and at least one of R$_a$, R$_b$, R$_c$, and R$_d$ may be —NH$_2$.

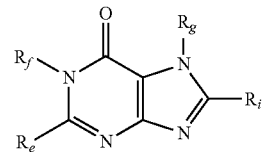

Formula 3

In Formula 3,
R$_e$, R$_f$, R$_g$, and R$_i$ may be each independently a hydrogen atom, a halogen atom, a cyano group, a hydroxyl group, —NH$_2$, —C(=O)R", —C(=O)OR", —OCO(OR"), —C=N(R″), a substituted or unsubstituted C1-C10 alkyl group, a substituted or unsubstituted C1-C10 alkoxy group, a substituted or unsubstituted C2-C10 alkenyl group, a substituted or unsubstituted C2-C10 alkynyl group, a C2-C10 alkylene oxide group, a substituted or unsubstituted C3-C20 cycloalkyl group, a substituted or unsubstituted C6-C20 aryl group, a substituted or unsubstituted C6-C20 aryloxy group, a substituted or unsubstituted C6-C20 heteroaryl group, or a combination thereof, wherein R″ may be a hydrogen atom, a C1-C10 alkyl group, or a C6-C20 aryl group, and at least one of $R_e$, $R_f$, $R_g$, and $R_i$ may be —$NH_2$.

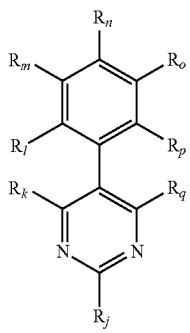

Formula 4

In Formula 4, $R_j$, $R_k$, $R_l$, $R_m$, $R_n$, $R_o$, $R_p$, and $R_q$ may be each independently a hydrogen atom, a halogen atom, a cyano group, a hydroxyl group, —$NH_2$, —C(=O)R″, —C(=O)OR″, —OCO(OR″), —C=N(R″), a substituted or unsubstituted C1-C10 alkyl group, a substituted or unsubstituted C1-C10 alkoxy group, a substituted or unsubstituted C2-C10 alkenyl group, a substituted or unsubstituted C2-C10 alkynyl group, a C2-C10 alkylene oxide group, a substituted or unsubstituted C3-C20 cycloalkyl group, a substituted or unsubstituted C6-C20 aryl group, a substituted or unsubstituted C6-C20 aryloxy group, a substituted or unsubstituted C6-C20 heteroaryl group, or a combination thereof, wherein R″ may be a hydrogen atom, a C1-C10 alkyl group, or a C6-C20 aryl group, and at least one of $R_j$, $R_k$, $R_l$, $R_m$, $R_n$, $R_o$, $R_p$, and $R_q$ may be —$NH_2$.

The substituents used in Formula 2, Formula 3, or Formula 4 are as described above and thus detailed descriptions thereof will not be repeated for clarity.

The ion-conductive oligomer may have a radius of gyration $R_g$ of 3 nanometers (nm) or less. The radius of gyration $R_g$ of the ion-conductive oligomer may be, for example, from about 0.1 nm to about 3 nm. The radius of gyration $R_g$ of the ion-conductive oligomer refers to a radius of rotation indicating an average distance from a center of mass of the ion-conductive oligomer chain to different ends. In this regard, the average distance is determined based on a root mean square (rms) of a distance.

The protective layer may further include a lithium salt. Since the lithium salt enables coordinate covalent bonds between the protective layer and a solvent thereby increasing a concentration of lithium ions available in the electrolyte, side reactions between the electrolyte and the negative electrode may be suppressed, and thus charging and discharging characteristics and electrochemical stability may further be improved.

The lithium salt may include LiSCN, $LiN(CN)_2$, $LiClO_4$, LiI, $LiBF_4$, $LiAsF_6$, $LiPF_6$, $LiCF_3SO_3$, $LiC(CF_3SO_2)_3$, $LiN(SO_2C_2F_5)_2$, $LiN(SO_2CF_3)_2$, $LiN(SO_2F)_2$, $LiSbF_6$, $LiPF_3(CF_2CF_3)_3$, $LiPF_3(CF_3)_3$, $LiB(C_2O_4)_2$, or a combination thereof.

The protective layer may further include an organic particle, an inorganic particle, an organic-inorganic particle, or a combination thereof, and having a particle diameter greater than 1 μm and equal to or less than 100 μm.

The particle may be spherical, microspherical, rod-shaped, ellipsoidal, radial, or a combined shape thereof.

When spherical, the particle may be, for example, a microsphere having an average particle diameter greater than 1 μm and equal to or less than 100 μm. For example, the average particle diameter of microspheres may be from about 1.5 to about 75 μm, for example, from about 1.5 to about 50 μm, for example, from about 1.5 to about 20 μm, or for example, from about 1.5 to about 10 μm. When the average particle diameter of the particles is equal to or less than 1 μm, a metal battery, for example, a lithium metal battery including a protective layer having the particles may have less electrodeposition density of lithium than a lithium metal battery including a protective layer having particles with an average particle diameter greater than 1 μm and equal to or less than 100 μm. The particles may further suppress the growth of dendrite while lithium ions are intercalated/deintercalated during charge and discharge by enhancing surface protection of the metal substrate.

Throughout the specification, the term "average particle diameter" refers to D50 that is an accumulative particle diameter at 50% in an accumulative particle diameter distribution curve from the smallest particle diameter to the greatest particle diameter. In this case, a total number of accumulated particles is referred to as 100%. The average particle diameter may be measured according to methods well known to those skilled in the art. For example, the average particle diameter may be measured using a particle diameter analyzer, transmission electron microscopic (TEM) images, or scanning electron microscopic (SEM) images. Alternatively, the average particle diameter may be measured by dynamic light scattering. According to this method, the number of particles having particle diameters within a predetermined range may be counted and an average particle diameter may be calculated based thereon.

The particles may be interconnected. The particles may be microspheres having a monomodal particle diameter distribution. The monomodal particle diameter distribution may have a standard deviation less than 40%, for example 20% or less, for example, 10% or less, for example, 1% or greater and less than 40%, for example, in the range of about 2 to about 25%, or for example, in the range of about 3 to about 10%, when analyzed using a particle diameter analyzer (Dynamic Light Scattering: DLS, Nicomp 380).

The particle may include polystyrene, a copolymer including a styrene repeating unit, a copolymer including a repeating unit having a crosslinkable functional group, a crosslinked polymer, or a combination thereof. The particle may be a polymer (homopolymer or copolymer) including a styrene-based repeating unit. Since the polymer having a styrene-based repeating unit is hydrophobic, the polymer may not adversely affect the negative electrode and may minimize reactivity of the negative electrode to an electrolyte due to little wettability with respect to the electrolyte.

For example, at least one of the particles may include a first polymer, which is polystyrene, a poly(styrene-divinylbenzene) copolymer, a poly(methylmethacrylate-divinylbenzene) copolymer, a poly(ethylmethacrylate-divinylbenzene) copolymer, a poly(pentylmethacrylate-divinylbenzene) copolymer, a poly(butylmethacrylate-divinylbenzene) copolymer, a poly(propylmethacrylate-divinylbenzene) copolymer, a poly(styrene-ethylene-butyleneethylene-butylene-styrene) copolymer, a poly(styrene-methylmethacrylate) copolymer, a poly(styrene-acrylonitrile) copolymer, a poly(styrene-vinylpyridine) copolymer, a poly(acrylonitrile-butadiene-styrene) copolymer, a poly(acrylonitrile-ethylene-propylene-styrene) copolymer, a poly(methylmethacrylate-acrylonitrile-butadiene-styrene) copolymer, a poly(methacrylate-butadiene-styrene) copolymer, a poly(styrene-(C1-C9 alkyl) acrylate) copolymer, and a poly(acrylonitrile-styrene-(C1-C9 alkyl) acrylate) copolymer, a crosslinked polymer of the first polymer, or a combination thereof.

The crosslinked polymer of the first polymer may have a crosslinkable group. The poly(styrene-divinylbenzene) copolymer may be represented by Formula 11.

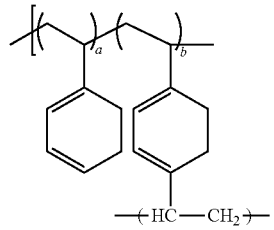

Formula 11

In Formula 11, a and b are mole fractions and are each independently from about 0.01 to about 0.99 and a sum of a and b may be 1. In Formula 11, a may be, for example, from about 0.95 to about 0.99, for example, from about 0.96 to about 0.99, and for example, from about 0.98 to about 0.99, and b may be, for example, from about 0.01 to about 0.05, for example, from about 0.01 to about 0.04, or for example, from about 0.01 to about 0.02.

The poly(styrene-divinylbenzene) copolymer may be represented by Formula 11a.

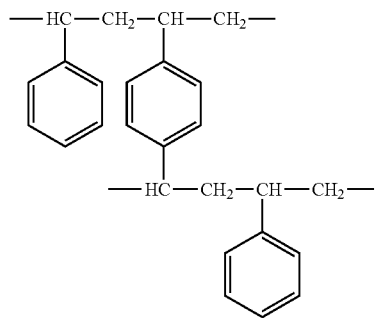

Formula 11a

The poly(styrene-divinylbenzene) copolymer may be represented by Formula 11b.

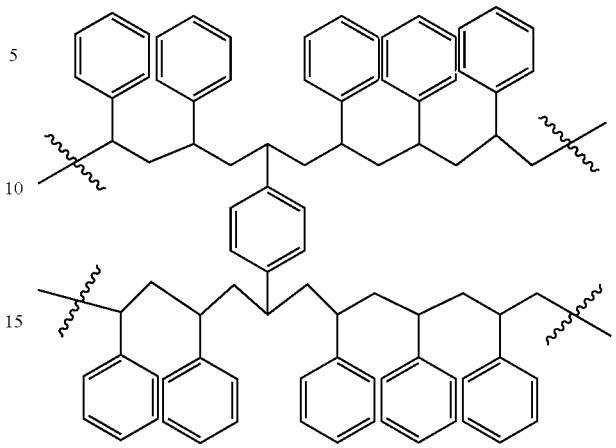

Formula 11b

The poly(acrylonitrile-butadiene-styrene) copolymer may be represented by Formula 12.

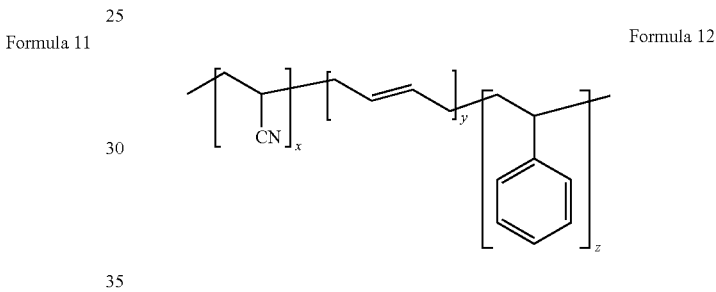

Formula 12

In Formula 12, x, y and z are mole fractions and each independently from about 0.01 to about 0.99, and a sum of x, y and z may be 1.

In Formula 12, x may be from about 0.1 to about 0.35, y may be from about 0.05 to about 0.55, and z may be from about 0.2 to about 0.7. For example, x may be from about 0.15 to about 0.35, y may be from about 0.05 to about 0.3, and z may be from about 0.4 to about 0.6.

Degrees of polymerization of the poly(styrene-divinylbenzene) copolymer represented by Formula 11 and the poly(acrylonitrile-butadiene-styrene) copolymer represented by Formula 12 may be from about 2 to about 5,000 and for example, from about 5 to about 1,000 respectively.

For example, the poly(styrene-divinylbenzene) copolymer represented by Formula 11 and the poly(acrylonitrile-butadiene-styrene) copolymer represented by Formula 12 may be block copolymers.

The crosslinked polymer refers to a polymer having crosslinkable functional groups which are crosslinked with each other. The crosslinked polymer may be a crosslinked product of a copolymer having a crosslinkable functional group-containing repeating unit.

The crosslinked polymer may be: a crosslinked product of a block copolymer including a polyethylene oxide block having a (meth)acrylate functional group and a polystyrene block; or a crosslinked product of a (C1-C9 alkyl)(meth)acrylate, a (C1-C12 glycol) diacrylate, a poly(C2-C6 alkylene glycol) diacrylate, a polyol polyacrylate, or a combination thereof. Examples of the (C1-C9 alkyl)(meth)acrylate are, for example, hexyl acrylate, 2-ethylhexyl acrylate, or allyl methacrylate.

Examples of glycol diacrylate are 1,4-butanediol diacrylate, 1,3-butylene glycol diacrylate, 1,6-hexanediol diacrylate, ethylene glycol diacrylate, or neopentyl glycol diacrylate. Examples of polyalkylene glycol diacrylate are diethylene glycol diacrylate, triethylene glycol diacrylate, tetraethylene glycol diacrylate, tripropylene glycol diacrylate, polyethylene glycol diacrylate, or polypropyleneglycol acrylate.

Examples of polyol polyacrylate are trimethylol propane triacrylate, pentaerythritol tetraacrylate, or pentaerythritol triacrylate.

For example, the crosslinked polymer may be a poly(styrene-divinylbenzene) copolymer, a poly(methylmethacrylate-divinylbenzene), or a crosslinked product of the first polymer. Here, the first polymer has a crosslinkable functional group and a crosslinked product thereof may be prepared via crosslinking therebetween.

When the copolymer described above includes a styrene-based repeating unit, an amount of the styrene-based repeating unit may be, for example, from about 65 to about 99 parts by weight, from about 80 to about 99 parts by weight, from about 90 to about 99 parts by weight, and from about 96 to about 99 parts by weight based on 100 parts by weight of the weight of the copolymer.

When the copolymer includes divinylbenzene, an amount of divinylbenzene may be, for example, from about 1 to about 35 parts by weight, from about 1 to about 20 parts by weight, from about 1 to about 10 parts by weight, from about 1 to about 4 parts by weight, from about 3 to about 7 parts by weight, and for example, 5 parts by weight based on 100 parts by weight of the copolymer.

In the poly(methylmethacrylate-divinylbenzene) copolymer, the poly(ethylmethacrylate-divinylbenzene) copolymer, the poly(pentylmethacrylate-divinylbenzene) copolymer, the poly(butylmethacrylate-divinylbenzene) copolymer, and the poly(propylmethacrylate-divinylbenzene) copolymer described above, amounts of methylmethacrylate, ethylmethacrylate, pentylmethacrylate, butylmethacrylate, and propylmethacrylate repeating units may be from about 65 to about 99 parts by weight, from about 80 to about 99 parts by weight, from about 90 to about 99 parts by weight, and for example, from about 96 to about 99 parts by weight respectively based on 100 parts by weight of the copolymer.

In the poly(styrene-ethylene-butylene-styrene) copolymer, the poly(styrene-methylmethacrylate) copolymer, the poly(styrene-acrylonitrile) copolymer, the poly(styrene-vinylpyridine) copolymer, the poly(acrylonitrile-butadiene-styrene) copolymer, the poly(acrylonitrile-ethylene-propylene-styrene) copolymer, the poly(methylmethacrylate-acrylonitrile-butadiene-styrene) copolymer, the poly(methacrylate-butadiene-styrene) copolymer, the poly(styrene-(C1-C9 alkyl) (meth)acrylate) copolymer, and the poly(acrylonitrile-styrene-(C1-C9 alkyl) (meth)acrylate) copolymer described above, an amount of the styrene-based repeating unit may be from about 65 to about 99 parts by weight, from about 80 to about 99 parts by weight, from about 90 to about 99 parts by weight, and for example, from about 96 to about 99 parts by weight based on 100 parts by weight of the total weight of the copolymer. Also, when the above-described copolymers are a ternary or quaternary copolymer, amounts of remaining repeating units except for the styrene-based repeating unit may be adjusted in various ratios. The above-described copolymers may include a block copolymer a random copolymer, an alternating copolymer, a graft copolymer, and the like. The weight average molecular weights of the copolymers may be in the range of about 10,000 to about 200,000 g/mol. The weight average molecular weights of the copolymers may be measured as describe above, and thus detailed descriptions thereof will not be repeated.

The particle of the protective layer may be an inorganic particle. The inorganic particle may include, for example, $SiO_2$, $TiO_2$, ZnO, $Al_2O_3$, or $BaTiO_3$.

The particle of the protective layer may be an organic-inorganic particle. For example, the organic-inorganic particle may include at least one silsesquioxane having a cage-like structure and a metal-organic framework (MOF).

The silsesquioxane having a cage-like structure may be, for example, polyhedral oligomeric silsesquioxane (POSS). POSS includes 8 silicon atoms or less, for example, 6 or 8 silicon atoms. Silsesquioxane having a cage-like structure may be a compound represented by Formula 13.

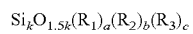

$$Si_kO_{1.5k}(R_1)_a(R_2)_b(R_3)_c \quad \text{Formula 13}$$

In Formula 13, $R_1$, $R_2$, and $R_3$ may be each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

In Formula 13, 0<a<20, 0<b<20, and 0<c<20, k=a+b+c, and a, b and c may be selected to satisfy 6≤k≤20.

The silsesquioxane having a cage-like structure may be a compound represented by Formula 14 below or Formula 15.

Formula 14

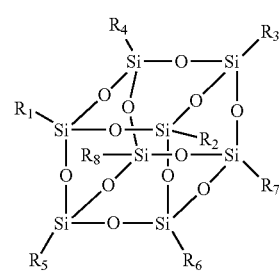

In Formula 14, $R_1$ to $R_8$ may be each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

Formula 15

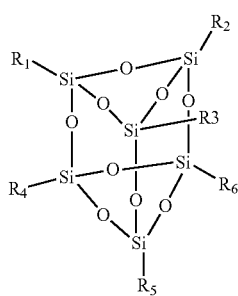

In Formula 15, $R_1$ to $R_6$ may be each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

According to an embodiment, in the silsesquioxane having a cage-like structure, $R_1$-$R_8$ of Formula 14 and $R_1$-$R_6$ of Formula 15 may be isobutyl groups. For example, silsesquioxane having a cage-like structure may be octaisobutyl-t8-silsesquioxane.

The MOF is a porous crystalline compound formed via chemical bonds between a metal ion of Group 2 to Group 15 or a metal ion cluster of Group 2 to Group 15 and an organic ligand.

The organic ligand refers to an organic group forming chemical bonds such as coordinate covalent bonds, ionic bonds, or covalent bonds. For example, an organic group having at least two binding sites to the above-described metal ion may form a stable structure with the metal ion.

The metal ions of Group 2 to Group 15 may include at least one of cobalt (Co), nickel (Ni), molybdenum (Mo), tungsten (W), ruthenium (Ru), osmium (Os), cadmium (Cd), beryllium (Be), calcium (Ca), barium (Ba), strontium (Sr), iron (Fe), manganese (Mn), chromium (Cr), vanadium (V), aluminum (Al), titanium (Ti), zirconium (Zr), copper (Cu), zinc (Zn), magnesium (Mg), hafnium (Hf), niobium (Nb), tantalum (Ta), rhenium (Re), rhodium (Rh), iridium (Ir), palladium (Pd), platinum (Pt), silver (Ag), scandium (Sc), yttrium (Y), indium (In), thallium (Ti), silicon (Si), germanium (Ge), tin (Sn), lead (Pb), arsenic (As), antimony (Sb), and bismuth (Bi), and the organic ligand may be a group derived from a compound having at least one functional group selected from aromatic dicarboxylic acid, aromatic tricarboxylic acid, an imidazole-based compound, a tetrazole-based compound, 1,2,3-triazol, 1,2,4-triazol, pyrazole, aromatic sulfonic acid, aromatic phosphoric acid, aromatic sulfinic acid, aromatic phosphinic acid, bipyridine, an amino group, an imidino group, an amide group, a methane dithio group (—$CS_2H$), a methane dithio anion (—$CS_2^-$), a pyridine group, and a pyrazine group.

The aromatic dicarboxylic acid or aromatic tricarboxylic acid described above may be benzene dicarboxylic acid, benzene tricarboxylic acid, biphenyl dicarboxylic acid, triphenyl dicarboxylic acid, or the like below.

Particularly, the organic ligand described above may be a group derived from a compound represented by Formula 16.

Formula 16

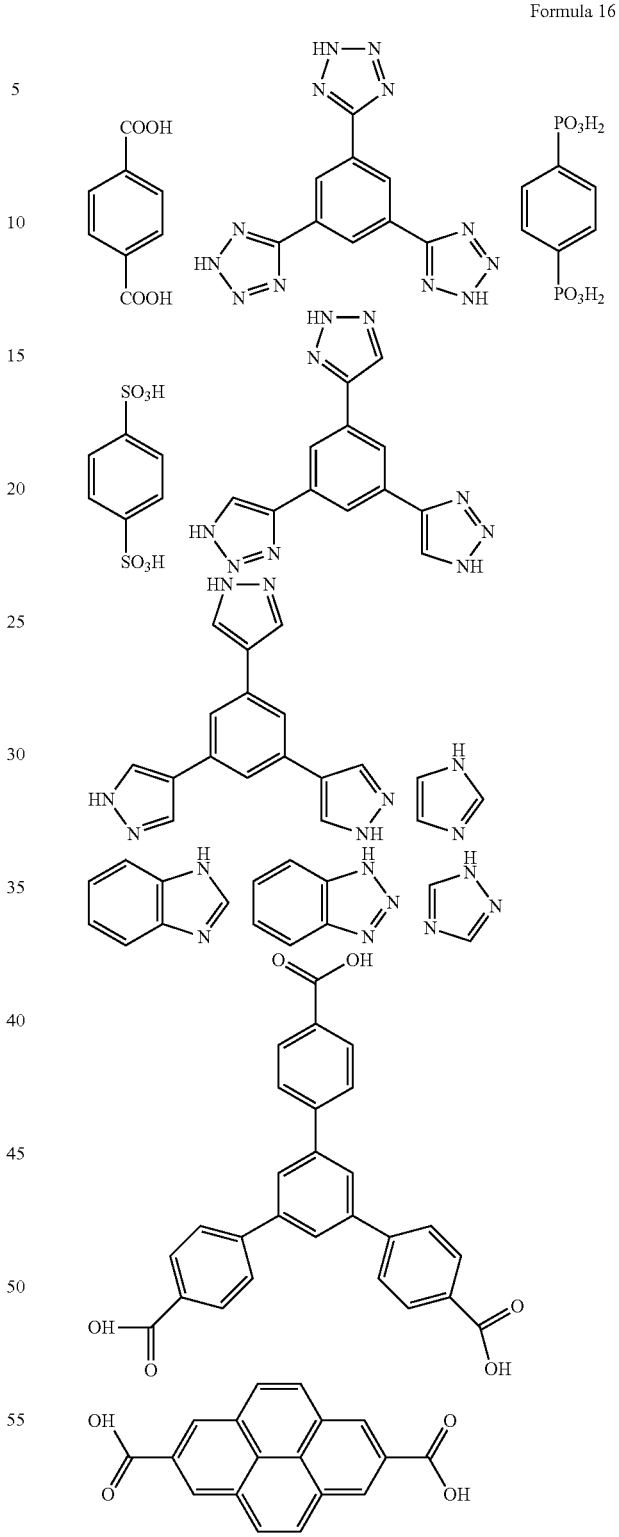

The MOF may be, for example, $Ti_8O_8(OH)_4[O_2C—C_6H_4—CO_2]_6$, $Cu(bpy)(H_2O)_2(BF_4)_2(bpy)\{bpy=4,4'-bipyridine\}$, $Zn_4O(O_2C—C_6H_4—CO_2)_3$ (Zn-terephthalic acid-MOF, Zn-MOF), or $Al(OH)\{O_2C—C_6H_4—CO_2\}$.

The protective layer may include i) at least one particle comprising a silsesquioxane having a cage-like structure, a metal-organic framework (MOF), $Li_{1+x+y}Al_xTi_{2-x}Si_yP_{3-y}O_{12}$ (0<x<2 and 0≤y<3), $BaTiO_3$, $Pb(Zr_pTi_{1-p})O_3$ (PZT and 0≤p≤1), $Pb_{1-x}La_xZr_{1-y}Ti_yO_3$(PLZT, 0≤x<1, and 0≤y<1), $Pb(Mg_{1/3}Nb_{2/3})O_3$—$PbTiO_3$ (PMN-PT), $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, SiC, $Li_3PO_4$, $Li_xTi_y(PO_4)_3$(0<x<2 and 0<y<3), $Li_xAl_yTi_z(PO_4)_3$(0<x<2, 0<y<1, and 0<z<3), $Li_{1+x+y}(Al_pGa_{1-p})_x(Ti_qGe_{1-q})_{2-x}Si_yP_{3-y}O_{12}$ (0≤x≤1 and 0≤y≤1) $Li_xLa_yTiO_3$ (0<x<2 and 0<y<3), $Li_xGe_yP_zS_w$ (0<x<4, 0<y<1, 0<z<1, and 0<w<5), $Li_xN_y$ (0<x<4 and 0<y<2), $Li_xSi_yS_z$ (0<x<3, 0<y<2, and 0<z<4), $Li_xP_yS_z$ (0≤x<3, 0<y<3, and 0<z<7), $Li_2O$, LiF, LiOH, $Li_2CO_3$, $LiAlO_2$, $Li_2O$—$Al_2O_3$—$SiO_2$—$P_2O_5$—$TiO_2$—$GeO_2$, $Li_{3+x}La_3M_2O_{12}$ (M=Te, Nb, or Zr and 0≤x≤5); or ii) a crosslinked product of the particle. The crosslinked product of the particle has a crosslinkable functional group and has a crosslinked structure formed by the functional group.

The crosslinkable functional group may be any functional group that can be crosslinked and examples thereof may include an acrylate group, a methacrylate group, and an epoxy group.

When the crosslinkable functional groups are present on a surface of the particles, the particles may be covalently bonded to each other. Thus, mechanical strength of a protective layer including the particles may further be improved.

The term "carbocyclic group" used in the above-described formulae refers to a saturated or partially unsaturated, non-aromatic monocyclic, bicyclic, or tricyclic hydrocarbon group.

Figure 2:
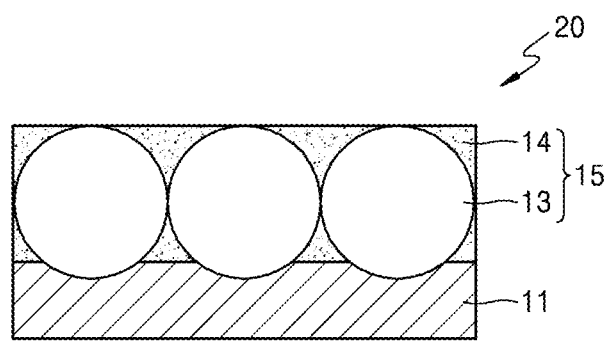
FIG. 2 is a schematic diagram of a structure of a negative electrode including a protective layer, according to a comparative embodiment.

FIG. 1 is a schematic diagram of a structure of a negative electrode 10 including a protective layer 4 according to an embodiment. FIG. 2 is a schematic diagram of a structure of a negative electrode 20 including a protective layer 15 according to a comparative embodiment.

As illustrated in FIG. 1, the negative electrode 10 including the protective layer 4 according to the present embodiment has a structure in which an ion-conductive oligomer coating layer 2 is disposed on a lithium metal or lithium metal alloy substrate 1 and microsphere particles 3 are disposed thereon. As illustrated in FIG. 2, the negative electrode 20 including the protective layer 15 according to the comparative embodiment has a structure in which microsphere particles 13 are disposed on a lithium metal or lithium metal alloy substrate 11 and a protective layer 15 including a crosslinked product 14 is disposed in spaces between the microsphere particles 13.

The negative electrode 10 including the protective layer 4 according to the present embodiment has a structure in which the protective layer 4 is directly disposed on the lithium metal or lithium metal alloy substrate 1 and reduces in side reactions occurring by the presence of a reaction initiator used during a crosslinking process or unreacted materials in comparison with the negative electrode 20 including the protective layer 15 according to the comparative embodiment formed by photocrosslinking or thermal crosslinking. Also, the ion-conductive oligomer coating layer 2 is easily impregnated into pores of the negative electrode, the separator, or the positive electrode. Since the protective layer 4 of the negative electrode 10 according to the present embodiment does not include the crosslinked product 14, the negative electrode 10 may have similar or greater ionic conductivity and higher mechanical strength than the negative electrode 20 including the protective layer 15 according to the comparative embodiment.

A metal battery according to another embodiment may include a positive electrode, the negative electrode described above, and an electrode disposed between the positive electrode and the negative electrode.

The electrolyte may include a liquid electrolyte, a solid electrolyte, a gel electrolyte, a polymeric ionic liquid, or a combination thereof. The metal battery may be, for example, a lithium metal battery.

Figure 3A:
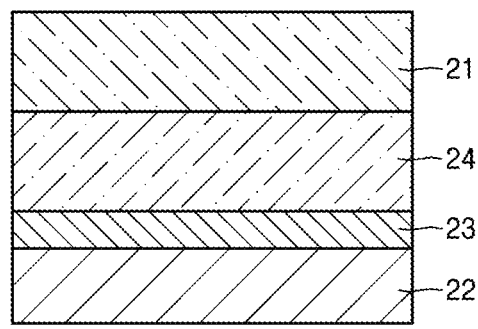
FIGS. 3A and 3B are schematic diagrams of structures of lithium metal batteries according to embodiments, respectively.
Figure 3B:
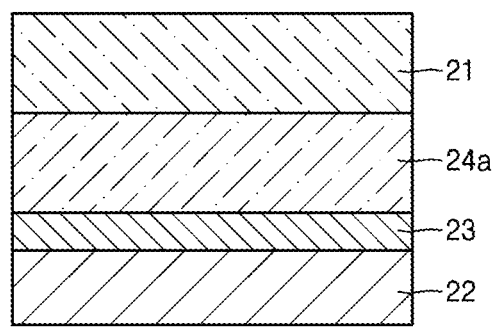

FIGS. 3A and 3B are schematic diagrams of structures of lithium metal batteries according to embodiments.

As illustrated in FIGS. 3A and 3B, a protective layer 23 is disposed on a negative electrode 22 and an intermediate layer 24 may further be disposed between the negative electrode 22 and the positive electrode 21. The intermediate layer 24 may be a separator 24 a as illustrated in FIG. 3B.

The separator 24 a may be formed of polyethylene, polypropylene, or polyvinylidene fluoride or may be a multilayer of at least two thereof. A mixed multilayer separator such as a polyethylene/polypropylene double-layered separator, a polyethylene/polypropylene/polyethylene triple-layered separator, and a polypropylene/polyethylene/polypropylene triple-layered separator may be used. An electrolyte including a lithium salt and an organic solvent may further be added to the separator.

The intermediate layer 24 may include the separator 24 a and a liquid electrolyte. If desired, a solid electrode as is used in a lithium battery may be used in the intermediate layer. The liquid electrolyte may include a lithium salt and an organic solvent.

The lithium salt may be included in a concentration of about 0.1 to about 4 molar (M). When the concentration of the lithium salt is 4 M, electrochemical stability may further be improved.

The organic solvent may be a carbonate, ester, ether, ketone, amine, or phosphine solvent. For example, the organic solvent may be an ether solvent.

The organic solvent may include ethylene carbonate, propylene carbonate, dimethyl carbonate, diethyl carbonate, ethylmethyl carbonate, fluoroethylenecarbonate, gamma-butyro lactone, dimethoxyethane, diethoxyethane, diethylene glycol dimethyl ether, triethylene glycol dimethyl ether, tetraethylene glycol dimethyl ether, polyethylene glycol dimethyl ether, succinonitrile, sulforane, dimethyl sulfone, ethylmethyl sulfone, diethyl sulfone, adiponitrile, tetraethylene glycol dimethyl ether, 1,1,2,2-tetrafluoroethyl 2,2,3,3-tetrafluoropropyl ether, or a combination thereof. For example, the organic solvent may include dimethoxyethane, diethoxyethane, diethylene glycol dimethyl ether, triethylene glycol dimethyl ether, tetraethylene glycol dimethyl ether, polyethylene glycol dimethyl ether, tetraethylene glycol dimethyl ether, or 1,1,2,2-tetrafluoroethyl 2,2,3,3-tetrafluoropropyl ether.

If desired, the liquid electrolyte mat include an ionic liquid.

Examples of the ionic liquid are compounds including a cation such as a linearly or branchedly substituted ammonium, imidazolium, pyrrolidinium, or piperidinium and an anion such as $PF_6^-$, $BF_4^-$, $CF_3SO_3^-$, $(CF_3SO_2)_2N^-$, $(C_2F_5SO_2)_2N^-$, $(C_2F_5SO_2)_2N^-$, or $(CN)_2N^-$.

The solid electrolyte may be an organic solid electrolyte or an inorganic solid electrolyte.

The organic solid electrolyte may be, for example, a polyethylene derivative, a polyethylene oxide derivative, a polypropylene oxide derivative, a phosphoric acid ester polymer, poly(L-lysine), polyester sulfide, polyvinyl alcohol, polyvinylidene fluoride, a polymer including ionic dissociation groups, or the like.

The inorganic solid electrolyte may be $Li_3N$, LiI, $Li_5NI_2$, $Li_3N$—LiI—LiOH, $Li_2SiS_3$, $Li_4SiO_4$, $Li_4SiO_4$—LiI—

LiOH, Li$_3$PO$_4$—Li$_2$S—SiS$_2$, Cu$_3$N, LiPON, Li$_2$S.GeS$_2$.Ga$_2$S$_3$, Li$_2$O.11Al$_2$O$_3$, (Na, Li)$_{1+x}$Ti$_{2-x}$Al$_x$(PO$_4$)$_3$ (0.1≤x≤0.9), Li$_{1+x}$Hf$_{2-x}$Al$_x$(PO$_4$)$_3$ (0.1≤x≤0.9), Na$_3$Zr$_2$Si$_2$PO$_{12}$, Li$_3$Zr$_2$Si$_2$PO$_{12}$, Na$_5$ZrP$_3$O$_{12}$, Na$_5$TiP$_3$O$_{12}$, Na$_3$Fe$_2$P$_3$O$_{12}$, Na$_4$NbP$_3$O$_{12}$, Na-Silicates, Li$_{0.3}$La$_{0.5}$TiO$_3$, Na$_5$MSi$_4$O$_{12}$ (M is a rear earth element such as Nd, Gd, and Dy) Li$_5$ZrP$_3$O$_{12}$, Li$_5$TiP$_3$O$_{12}$, Li$_3$Fe$_2$P$_3$O$_{12}$, Li$_{1+x}$(M,Al, Ga)$_x$(Ge$_{1-y}$Ti$_y$)$_{2-x}$(PO$_4$)$_3$ (x≤0.8, 0≤y≤1.0, M is Nd, Sm, Eu, Gd, Tb, Dy, Ho, Er, Tm, or Yb), Li$_{1+x+y}$Q$_x$Ti$_{2-x}$Si$_y$P$_{3-y}$O$_{12}$ (0<x≤0.4, 0<y≤0.6, Q is Al or Ga), Li$_6$BaLa$_2$Ta$_2$O$_{12}$, Li$_7$La$_3$Zr$_2$O$_{12}$, Li$_5$La$_3$Nb$_2$O$_{12}$, Li$_5$La$_3$M$_2$O$_{12}$(M is Nb or Ta), Li$_{7+x}$A$_x$La$_{3-x}$Zr$_2$O$_{12}$ (0<x<3 and A is Zn), or the like.

The polymer ionic liquid may be a polymerization product of an ionic liquid monomer or a polymeric compound. The polymer ionic liquid has high solubility in an organic solvent and may further improve ionic conductivity when added to an electrolyte. When the polymer ionic liquid is obtained by polymerizing the ionic liquid monomer, a polymerization product is washed and dried, and then subjected to anion substitution reaction to have an anion appropriate for providing solubility to the organic solvent.

The polymer ionic liquid may include a repeating unit having i) an ammonium, pyrolidium, pyridinium, pyrimidinium, imidazolium, piperidinium, pyrazolium, oxazolium, pyridazinium, phosphonium, sulfonium, or triazole, or a combination thereof and ii) BF$_4^-$, PF$_6^-$, AsF$_6^-$, SbF$_6^-$, AlCl$_4^-$, HSO$_4^-$, ClO$_4^-$, CH$_3$SO$_3^-$, CF$_3$CO$_2^-$, (CF$_3$SO$_2$)$_2$N$^-$, (FSO$_2$)$_2$N$^-$, Cl$^-$, Br$^-$, I$^-$, SO$_4^-$, CF$_3$SO$_3^-$, (C$_2$F$_5$SO$_2$)$_2$N$^-$, (C$_2$F$_5$SO$_2$)(CF$_3$SO$_2$)N$^-$, NO$_3^-$, Al$_2$Cl$_7^-$, (CF$_3$SO$_2$)$_3$C$^-$, (CR$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, SF$_5$CF$_2$SO$_3^-$, SF$_5$CHFCF$_2$SO$_3^-$, CF$_3$CF$_2$(CF$_3$)$_2$CO$^-$, (CF$_3$SO$_2$)$_2$CH$^-$, (SF$_5$)$_3$C$^-$, (O(CF$_3$)$_2$C$_2$(CF$_3$)$_2$O)$_2$PO$^-$, or a combination thereof.

Alternatively, the polymer ionic liquid may be prepared by polymerizing the ionic liquid monomer. The ionic liquid monomer may have a polymerizable functional group such as a vinyl group, an allyl group, an acrylate group, a methacrylate group and include an ammonium, pyrolidium, pyridinium, pyrimidinium, imidazolium, piperidinium, pyrazolium, oxazolium, pyridazinium, phosphonium, sulfonium, or triazole, or a combination thereof and the above-described anion.

Examples of the ionic liquid monomer may include 1-vinyl-3-ethylimidazolium bromide and compounds represented by Formulae H and I.

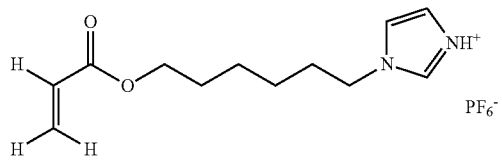

Formula H

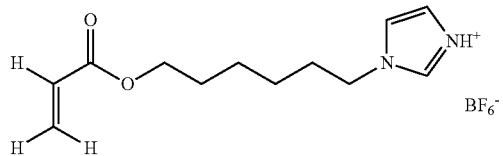

Formula I

Examples of the polymer ionic liquid may include compounds represented by Formulae J and K below.

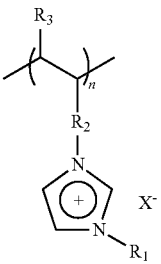

Formula J

In Formula J, R$_1$ and R$_3$ may be each independently a hydrogen atom, a substituted or unsubstituted C1-C30 alkyl group, a substituted or unsubstituted C2-C30 alkenyl group, a substituted or unsubstituted C2-C30 alkynyl group, a substituted or unsubstituted C6-C30 aryl group, a substituted or unsubstituted C2-C30 heteroaryl group, or a substituted or unsubstituted C4-C30 carbocyclic group, R$_2$ may be a chemical bond, a C1-C3 alkylene group, a C6-C30 arylene group, a C2-C30 heteroarylene group, or a C4-C30 carbocyclic group, and X$^-$ may be an anon of the ionic liquid, and n may be an integer from 500 to 2800.

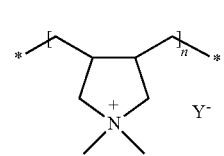

Formula K

In Formula K, Y$^-$ is defined the same as X$^-$ of Formula J and n may be an integer from 500 to 2800.

In Formula K, Y$^-$ may be, for example, bis(trifluoromethane sulfonyl)imide (TFSI), bis(fluoromethane sulfonyl)imide, BF$_4$, or CF$_3$SO$_3$.

For example, the polymer ionic liquid may include a cation comprising poly(1-vinyl-3-alkylimidazolium), poly (1-allyl-3-alkylimidazolium), and poly(1-(methacryloyloxy-3-alkylimidazolium), and an anion selected from CH$_3$COO$^-$, CF$_3$COO$^-$, CH$_3$SO$_3^-$, CF$_3$SO$_3^-$, (CF$_3$SO$_2$)$_2$N$^-$, (FSO$_2$)$_2$N$^-$, (CF$_3$SO$_2$)$_3$C$^-$, (CF$_3$CF$_2$SO$_2$)$_2$N$^-$, C$_4$F$_9$SO$_3^-$, C$_3$F$_7$COO$^-$, (CF$_3$SO$_2$)(CF$_3$CO)N$^-$, or a combination thereof.

Examples of the compound represented by Formula K may include polydiallyldimethylammonium bis(trifluoromethanesulfonyl)imide.

Since the substituents and functional groups used in the compounds represented by Formula J or K are as described above, detailed descriptions thereof will not be repeated.

Figure 4:
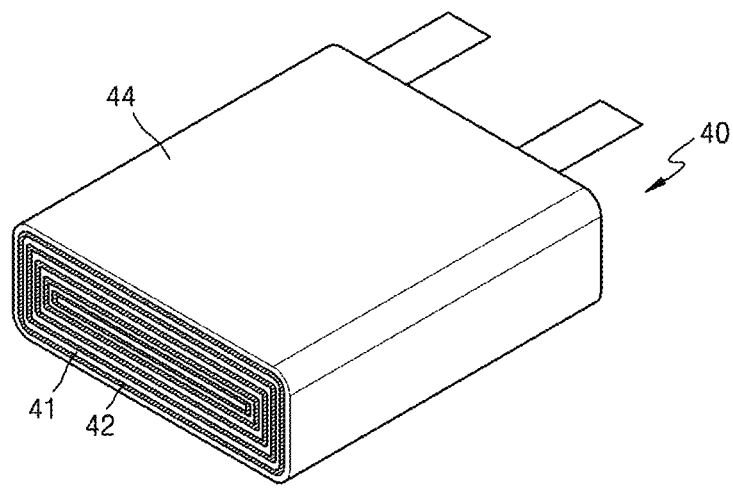
FIG. 4 is a schematic diagram of a structure of a lithium metal battery according to an embodiment.

FIG. 4 is a schematic diagram of a structure of a lithium metal battery 30 according to an embodiment.

As illustrated in FIG. 4, the lithium metal battery 30 includes a positive electrode 31, a negative electrode 32, and a battery can 34 accommodating the positive electrode 31 and the negative electrode 32.

The negative electrode 32 may be the above-described negative electrode including lithium metal or a lithium alloy on which the protective layer including the ion-conductive oligomer is disposed.

The positive electrode 31 may be prepared by coating a positive active material on a surface of a positive current collector formed of aluminum or the like. Alternatively, the positive electrode 31 may be prepared by casting the positive active material on a separate support and laminating a positive active material film separated from the support on a current collector.

The positive active material may be a compound allowing intercalation and deintercalation of lithium, inorganic sulfur ($S_8$), or a sulfur-based compound.

Examples of the compound allowing intercalation and deintercalation of lithium include $Li_aA_{1-b}B'_bD'_2$ (where $0.90 \leq a \leq 1.8$ and $0 \leq b \leq 0.5$); $Li_aE_{1-b}B'_bO_{2-c}D'_c$ (where $0.9 \leq a \leq 1.8$, $0 \leq b \leq 0.5$, and $0 \leq c \leq 0.05$); $LiE_{2-b}B'_bO_{4-c}D'_c$ (where $0 \leq b \leq 0.5$ and $0 \leq c \leq 0.05$); $Li_aNi_{1-b-c}Co_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cD'_\alpha$ (where $0.90 \leq a \leq 1.8$, $0 \leq b \leq 0.5$, $0 c \leq c \leq 0.05$, and $0 < \alpha \leq 2$); $Li_aNi_{1-b-c}Mn_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2GbO_4$ (where $0.90 \leq a \leq 1.8$ and $0.001 \leq b \leq 0.1$); $QO_2$; $QS_2$; $LiQS_2$; $V_2O_5$; $LiI'O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$. A combination comprising at least one of the foregoing may be used.

In the formulae, A is Ni, Co, Mn, or any combination thereof; B' is Al, Ni, Co, Mn, Cr, Fe, Mg, Sr, V, a rare earth element or any combination thereof; D' is O, F, S, P, or any combination thereof; E is Co, Mn, or any combination thereof; F' is F, S, P, or any combination thereof; G is Al, Cr, Mn, Fe, Mg, La, Ce, Sr, V, or any combination thereof; Q is Ti, Mo, Mn, or any combination thereof; I' is Cr, V, Fe, Sc, Y, or any combination thereof; and J is V, Cr, Mn, Co, Ni, Cu, or any combination thereof.

Examples of the sulfur-based compound may include a sulfide compound, an organosulfur compound, a carbon-sulfur polymer, or a combination thereof. The sulfide compound may include $Li_2S_n$ (where $n \geq 1$), 2,5-dimercapto-1,3,4-thiadiazole, 1,3,5-trithiocyanuric acid, or the like. Examples of the carbon-sulfur polymer may include $C2S_x$ (where x=2.5 to 50 and $n \geq 2$).

The positive active material may further include a binder and a conductive agent.

Examples of the binder include polyethylene, polypropylene, polytetrafluorethylene (PTFE), polyvinylidene difluoride (PVdF), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a fluorovinylidene-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, and an ethylene-acrylic acid copolymer, which may be used alone or in combination. However, the binder is not limited thereto, and any suitable material used in the art as a binder may also be used.

The conductive agent may be: a carbonaceous material such as carbon black, graphite, natural graphite particulates, artificial graphite, acetylene black, ketjen black, carbon fiber, and carbon nanotube; a metal such as copper, nickel, aluminum, and silver, each of which may be used in powder, fiber, or tube form; and conductive polymers such as polyphenylene derivatives. However, the conductive agent is not limited thereto, and any suitable material used in the art as a conductive agent may also be used.

Alternatively, a positive electrode not including sulfur or organosulfur may be prepared and a catholyte prepared by adding a sulfur-containing positive active material to an electrolyte may be used.

The above-described electrolyte may be disposed between the negative electrode 32 and the positive electrode 31. The electrolyte may include the ion-conductive oligomer used in the protective layer. The lithium metal battery may include a liquid electrolyte, a solid electrolyte, and/or a separator between the positive electrode 31 and the electrolyte, if desired.

The lithium metal battery may be formed in a unit cell having a positive electrode/separator/negative electrode structure, a bi-cell having a positive electrode/separator/negative electrode/separator/positive electrode structure, or a layer-built structure in which a unit cell is repeated.

The lithium metal battery is available either as a lithium primary battery or a lithium secondary battery, for example, a lithium metal secondary battery. The lithium metal battery may have any of various forms, and for example, may be in the form of a coin, a button, a sheet, a stack, a cylinder, a plane, or a horn. Also, the lithium metal battery may be applied to a large battery for electric vehicles.

In the lithium metal battery, an electrodeposition density of lithium may be from about 0.5 to about 0.53 grams per cubic centimeter ($g/cm^3$).

The protective layer of the negative electrode may have an average thickness deviation from 0.1 to about 2 micrometers ($\mu m$).

The lithium metal battery may further include a separator. Since the structure of the separator is described above, additional detailed description thereof will not be repeated.

A method of preparing a negative electrode for a metal battery according to another embodiment includes providing a protective layer forming composition comprising an ion-conductive oligomer; applying, on at least a portion of a metal substrate, the protective layer forming composition to form a coating; and drying the coating. The protective layer composition includes an ion-conductive oligomer composition.

According to the method of preparing the negative electrode, the protective layer forming composition may be coated in-situ on the metal substrate and dried, and thus side reactions with the electrolyte may further be inhibited.

The organic solvent used in the protective layer forming composition may be any suitable organic solvent capable of dissolving the ion-conductive oligomer, for example, tetrahydrofuran, acetonitrile, chloroform, acetone, dioxolane, dimethylether, ethylmethylether, monochloroethane, dichloroethane, trichloroethane, dimethoxyethane, triglyme, or tetraglyme. A combination comprising at least one of the foregoing may be used.

The protective layer forming composition including the ion-conductive oligomer composition may be coated using any suitable method, for example, solution casting, spray coating, bar coating, dip coating, and spin coating.

The drying may include heat treatment and the heat treatment may be performed at a temperature of about 40° C. to about 100° C. for about 12 hours to about 24 hours.

Hereinafter, one or more embodiments will be described in further detail with reference to the following examples and comparative examples. These examples and comparative examples are not intended to limit the purpose and scope of the one or more embodiments of the present invention.

EXAMPLES

Preparation of Negative Electrode

Example 1: Preparation of Negative Electrode

A compound represented by Formula 5 below was obtained by refluxing a solution prepared by dissolving 4.75 moles (mol) of 2-amino-4-hydroxy-6-methylpyrimidine in 0.7 mol of hexyldiisocyanate at 100° C. for 16 hours. 60 mol of the compound of Formula 5 was added to a solution prepared by dissolving 15 mmol of polyethylene glycol (Mw=1000 g/mol) in chloroform, and two droplets of a dibutyltindilaurate catalyst were added thereto. The mixture was stirred at 60° C. for 16 hours to obtain a solution of an ion-conductive oligomer represented by Formula 6.

The solution of the ion-conductive oligomer represented by Formula 6 may be prepared through Reaction Scheme 1 below:

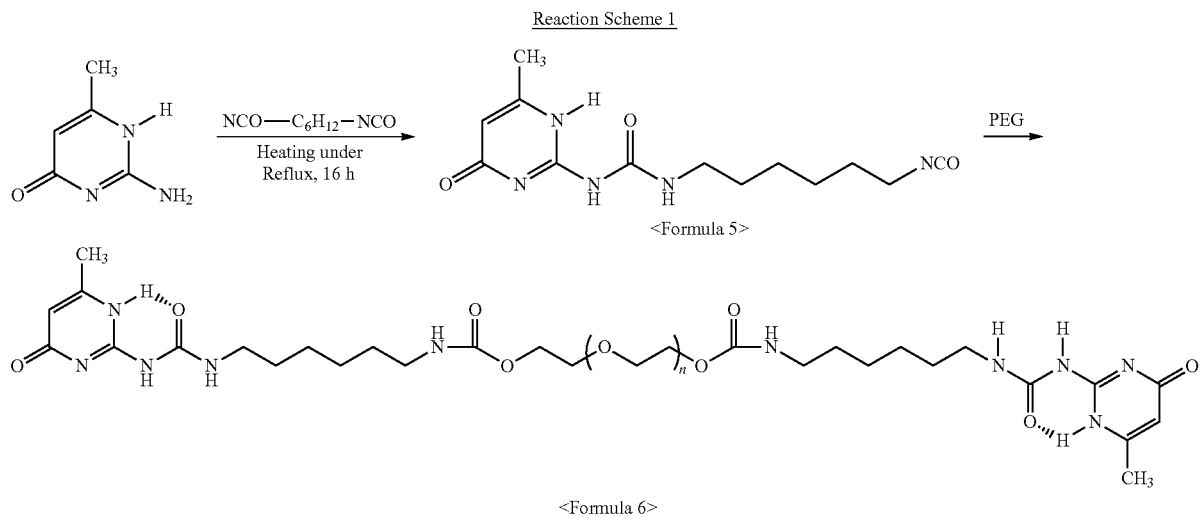

<Formula 6>

In Formula 6, n is from about 21 to about 22.

Separately, microspheres of a poly(styrene-b-divinylbenzene) block copolymer (average particle diameter=about 3 μm, EPR-PSD-3, EPRUI Nanoparticles & Microspheres Co. Ltd.) were added to anhydrous tetrahydrofuran to prepare 5% by weight of a block copolymer mixture. In the block copolymer, a mixing ratio of a polystyrene block to a polydivinylbenzene block was about 9:1 by weight. A weight average molecular weight Mw of the poly(styrene-b-divinylbenzene) block copolymer was about 100,000 g/mol.

The block copolymer-containing mixture was added to the solution of the ion-conductive oligomer represented by Formula 6 to prepare a protective layer forming composition.

The protective layer forming composition was coated to a thickness of about 2 μm on a lithium metal thin film (thickness: about 40 μm) formed on a copper (Cu) foil and the coated composition was primarily dried at about 25° C. and secondarily dried in a vacuum at about 40° C. for about 24 hours to remove the solvent. Thus, A negative electrode having a solid protective layer in which microspheres are disposed in-situ on the ion-conductive oligomer coating layer was prepared.

Reference Example 1: Preparation of Negative Electrode

A protective layer forming composition including the ion-conductive oligomer solution represented by Formula 6 was prepared in the same manner as in Example 1.

The protective layer forming composition of the ion-conductive oligomer solution represented by Formula 6 was coated on to a Cu foil (thickness: about 10 μm) to a thickness of about 2 μm using a doctor blade and the coated composition was primarily dried at about 25° C. and secondarily dried in a vacuum at about 40° C. for about 24 hours to remove a solvent. Thus, a negative electrode including a solid protective layer formed in-situ using the ion-conductive oligomer in-situ was prepared.

Comparative Example 1: Preparation of Negative Electrode

A protective layer forming composition of 5% by weight of a block copolymer mixture was prepared by adding microspheres of the poly(styrene-b-divinylbenzene) block copolymer (average particle diameter=about 3 μm, EPR-PSD-3, EPRUI Nanoparticles& Microspheres Co. Ltd.) to anhydrous tetrahydrofuran. A mixing ratio of the polystyrene block to the polydivinylbenzene block was about 9:1 in the block copolymer. A weight average molecular weight Mw of the poly(styrene-b-divinylbenzene) block copolymer was about 100,000 g/mol.

The protective layer forming composition was coated on a lithium metal thin film (thickness: about 40 μm) formed on a Cu foil to a thickness of about 3 μm using a doctor blade.

The resultant was dried at about 25° C. and further dried in a vacuum at about 40° C. for about 24 hours.

Separately, diethyleneglycol diacrylate (DEGDA) was dissolved in tetrahydrofuran to prepare 30% by weight of a solution. An amount of DEGDA was 30 parts by weight based on 100 parts by weight of microspheres of the poly(styrene-b-divinylbenzene) block copolymer. The solution was cast on the dried resultant. Next, the cast resultant was dried at about 25° C. for about 12 hours and exposed to UV at about 40° C. for 1 hour to prepare a negative electrode including a protective layer that includes microspheres disposed on a lithium metal thin film and a crosslinked product of diethylene glycol diacrylate (DEGDA) disposed in spaces between the microsphere was prepared. An amount of the crosslinked product of diethylene glycol diacrylate (DEGDA) was 20 parts by weight based on 100 parts by weight of the microspheres of the poly(styrene-b-divinylbenzene) block copolymer.

Comparative Example 2: Preparation of Negative Electrode

A negative electrode was prepared by forming a lithium metal thin film (thickness: about 40 μm) on a Cu foil (thickness: about 10 μm).

Comparative Reference Example 1: Preparation of Negative Electrode

A Cu foil substrate (thickness: about 10 μm) was prepared.
Preparation of Coil Cell Example 2: Preparation of Lithium Metal Battery (Coin Cell)

$LiNi_{0.6}Co_{0.2}Mn_{0.2}O_2$, Super-P (Timcal Ltd.) as a conductive agent, polyvinylidene fluoride (PVdF) were added to N-methylpyrrolidone in a weight ratio of 97:1.5:1.5 and mixed to prepare a positive active material layer forming composition.

The positive active material layer forming composition was coated on an aluminum (Al) foil (thickness: about 15 μm) and dried at 25° C., and then a dried resultant was further dried in a vacuum at about 110° C. to prepare a positive electrode.

A polyethylene separator (porosity: about 48%) was disposed between the positive electrode prepared as described above and the negative electrode prepared according to Example 1 to prepared a lithium metal battery (coin cell). In this regard, a liquid electrode was added between the positive electrode and the negative electrode prepared according to Example 1. The liquid electrolyte was prepared by dissolving 1.0 M $LiN(SO_2F)_2$ (LiFSI) in a mixed solvent of 1,2-dimethoxyethane (DME) and 1,1,2,2-tetrafluoroethyl 2,2,3,3-tetrafluoropropyl ether (TTE) mixed in a volume ratio of 2:8.

Reference Example 2: Preparation of Lithium Metal Battery (Coin Cell)

A lithium metal battery (coin cell) was prepared in the same manner as in Example 2, except that the negative electrode prepared according to Reference Example 1 was used instead of the negative electrode prepared according to Example 1.

Comparative Example 3: Preparation of Lithium Metal Battery (Coin Cell)

A lithium metal battery (coin cell) was prepared in the same manner as in Example 2, except that the negative electrode prepared according to Comparative Example 1 was used instead of the negative electrode prepared according to Example 1.

Comparative Reference Example 2: Preparation of Lithium Metal Battery (Coin Cell)

A lithium metal battery (coin cell) was prepared in the same manner as in Example 2, except that the negative electrode prepared according to Comparative Reference Example 1 was used instead of the negative electrode prepared according to Example 1.
Preparation of Lithium Symmetric Cell (Pouch Cell)

Example 3: Preparation of Lithium Symmetric Cell (Pouch Cell)

The protective layer forming composition prepared according to Example 1 was cast on a lithium metal thin film (thickness: about 40 μm) and dried at about 40° C. to prepare a lithium negative electrode.

A liquid electrolyte prepared by dissolving 4.0 M $LiN(SO_2F)_2$ (LiFSI) in a 1,2-dimethoxyethane (DME) solvent was injected into the protective layer of the lithium negative electrode to prepare a lithium symmetric cell (pouch cell) having a size of 3×3 cm².

The lithium symmetric cell (pouch cell) was prepared by sequentially stacking a lithium metal thin film, a solid protective layer (including microspheres disposed on an ion-conductive oligomer coating layer), a liquid electrolyte (4.0 M LiFSI in DME), a solid protective layer (including microspheres disposed on an ion-conductive oligomer coating layer), and a lithium metal thin film.

Comparative Example 4: Preparation of Lithium Symmetric Cell (Pouch Cell)

A lithium symmetric cell (pouch cell) having a size of 3×3 cm² was prepared in the same manner as in Example 3, except that the protective layer forming composition prepared according to Comparative Example 1 was used instead of the protective layer forming composition prepared according to Example 1.

The lithium symmetric cell (pouch cell) was prepared by sequentially stacking a lithium metal thin film, a solid protective layer (including microspheres and a crosslinked product of DEGDA disposed in spaces between the microspheres), a liquid electrolyte (4.0 M LiFSI in DME), a solid protective layer (including microspheres and a crosslinked product of DEGDA disposed in spaces between the microspheres), and a lithium metal thin film.
Preparation of Lithium Metal Battery (Pouch Symmetric Cell)

Example 4: Preparation of Preparation of Lithium Metal Battery (Pouch Symmetric Cell)

A negative electrode was prepared according to Example 1.

Separately, $LiNi_{0.33}Co_{0.33}Al_{0.33}O_2$ (NCA), Super-P (Timcal Ltd.) as a conductive agent, polyvinylidene fluoride (PVdF) were added to N-methylpyrrolidone in a weight ratio of 97:1.5:1.5 and mixed to prepare a positive active material layer forming composition.

The positive active material layer forming composition was coated on an Al foil (thickness: about 15 μm) and dried at 25° C., and then the dried resultant was further dried in a vacuum at about 110° C. to prepare a positive electrode.

Two negative electrodes prepared according to Example 1 were disposed on both sides of the prepared positive electrode and a liquid electrolyte was injected therebetween to prepare a lithium metal battery (pouch cell). The liquid electrolyte was prepared by dissolving 4.0 M LiN(SO$_2$F)$_2$ (LiFSI) in a mixed solvent of 1,2-dimethoxyethane (DME) and 1,1,2,2-tetrafluoroethyl 2,2,3,3-tetrafluoropropyl ether (TTE) mixed in a volume ratio of 2:8.

The lithium metal battery (pouch symmetric cell) was prepared by sequentially stacking a lithium metal thin film, a solid protective layer (including microspheres disposed on an ion-conductive oligomer coating layer), a liquid electrolyte (4.0 M LiFSI in DME-TTE), a positive electrode, a liquid electrolyte (4.0 M LiFSI in DME-TTE), a solid protective layer (including microspheres disposed on an ion-conductive oligomer coating layer), and a lithium metal thin film.

Reference Example 3: Preparation of Lithium Metal Battery (Pouch Symmetric Cell)

A lithium metal battery (pouch symmetric cell) was prepared in the same manner as in Example 4, except that the negative electrode prepared according to Reference Example 1 was used instead of the negative electrode prepared according to Example 1.

Comparative Example 5: Preparation of Lithium Metal Battery (Pouch Symmetric Cell)

A lithium metal battery (pouch symmetric cell) was prepared in the same manner as in Example 4, except that the negative electrode prepared according to Comparative Example 1 was used instead of the negative electrode prepared according to Example 1.

Analysis Example 1: SEM Image Analysis

A cross-section of the protective layer of the negative electrode prepared according to Example 1 was analyzed by using a scanning electron microscope (SEM). An SEM analyzer (SU-8030, Hitachi) was used therefor. Results are shown in FIG. 5.

Figure 5:
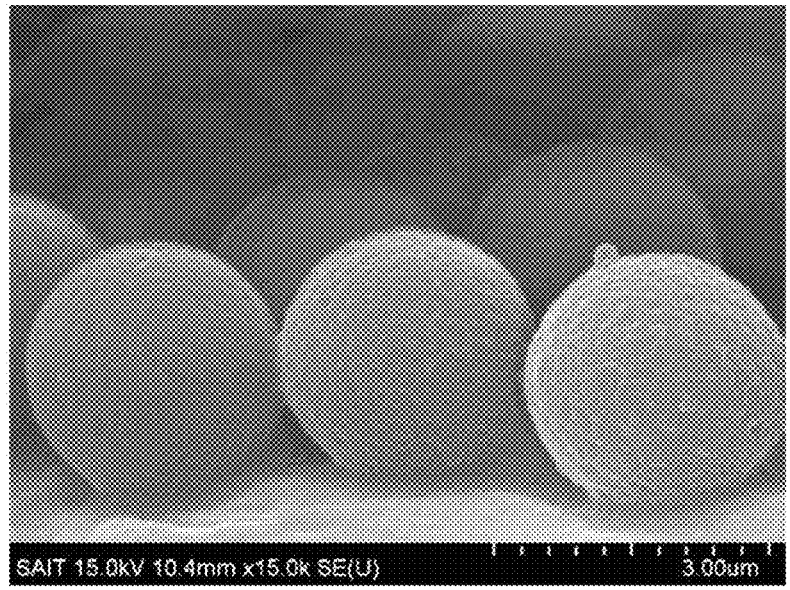
FIG. 5 is a scanning electron microscope (SEM) image of a cross-section of a protective layer of a negative electrode prepared according to Example 1.

Referring to FIG. 5, it may be confirmed that a solid protective layer having a thickness of about 2 μm in which microspheres are disposed on an ion-conductive oligomer coating layer is formed in the negative electrode prepared according to Example 1.

Analysis Example 2: $^1$H-NMR Analysis

The protective layer of the negative electrode prepared according to Example 1 was analyzed by $^1$H-NMR. A $^1$H-NMR analyzer (NMR 600 MHz, AVANCE III, Bruker) was used therefor. $^1$H-NMR analysis results are shown in FIGS. 6A and 6B.

Figure 6A:
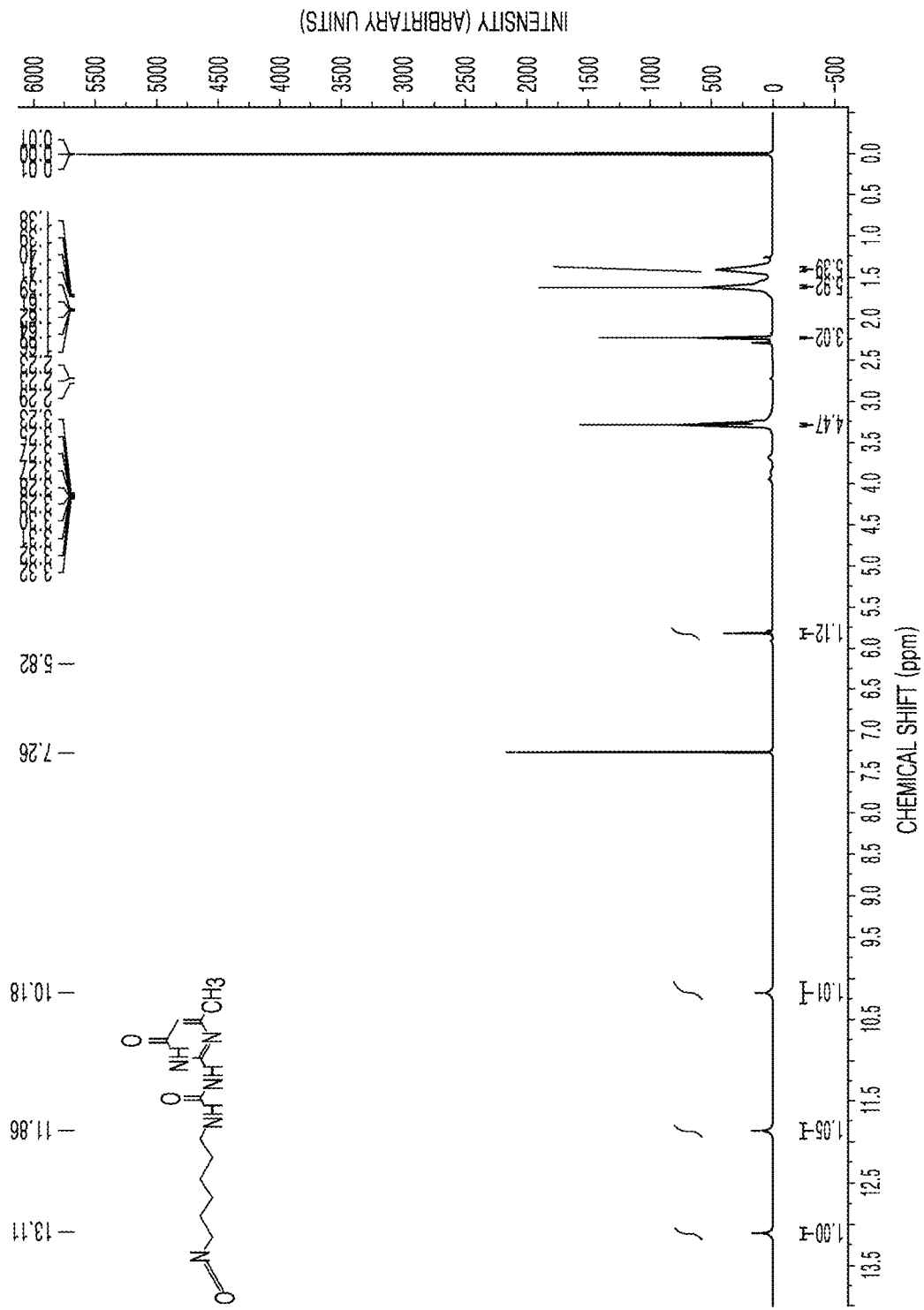
FIGS. 6A and 6B are each a graph of chemical shift (ppm) versus intensity (arbitrary units) showing the results of $^1$H-NMR analysis of an intermediate product of an ion-conductive oligomer represented by Formula 5 of Reaction Scheme 1 included in the protective layer of the negative electrode prepared according to Example 1, and a final product represented by Formula 6 of Reaction Scheme 1 and formed via linkage between the intermediate product and PEG, respectively.
Figure 6B:
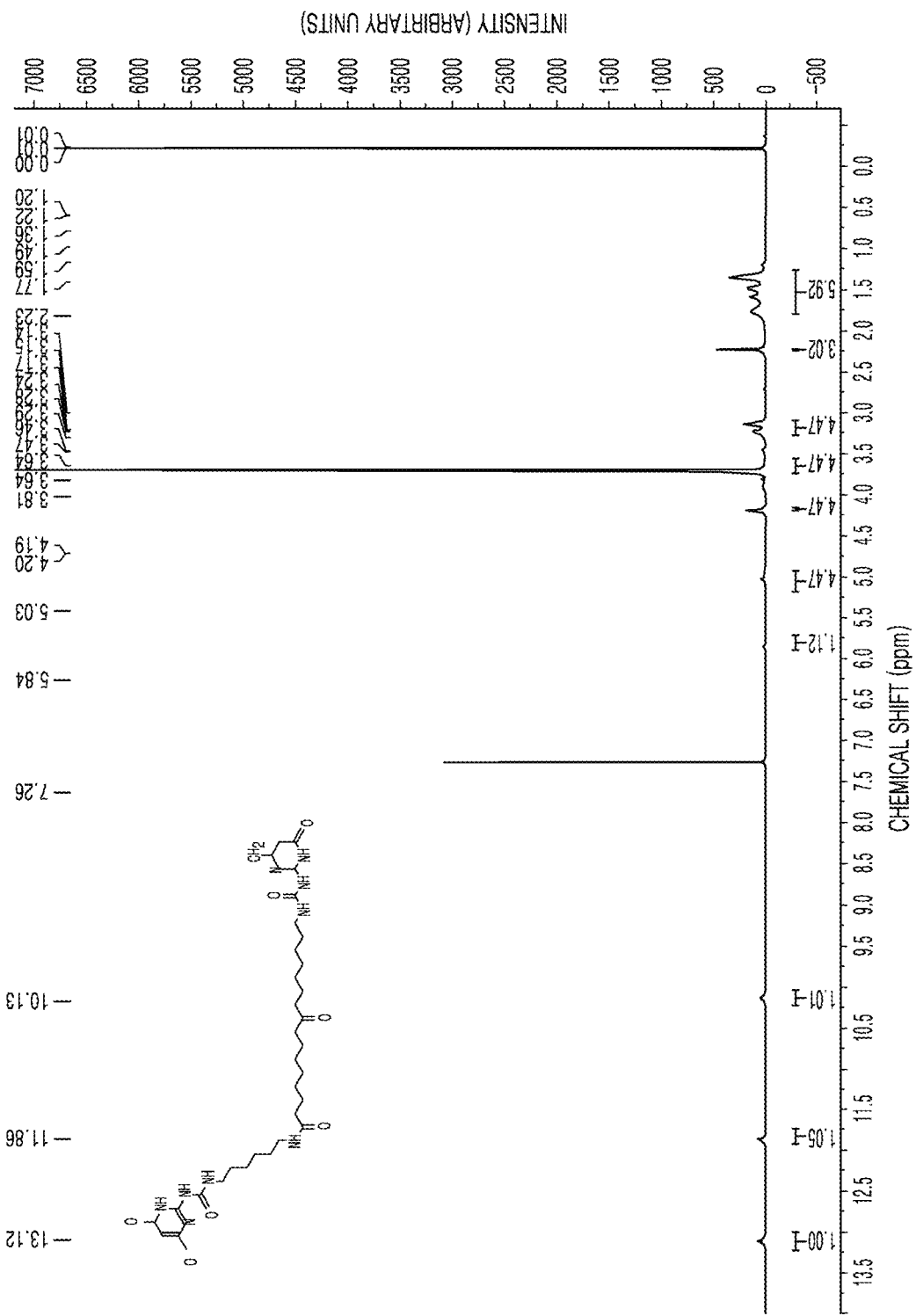

Referring to FIGS. 6A and 6B, peaks indicating characteristics of a side chain functional group of an intermediate product of the ion-conductive oligomer represented by Formula 5 of Reaction Scheme 1 included in the protective layer of the negative electrode prepared according to Example 1 and characteristics of a final product represented by Formula 6 of Reaction Scheme 1 formed via linkage between the side chain functional group and PEG were observed.

Evaluation Example 1: Evaluation of Charge and Discharge Characteristics 1-1. Lifespan Characteristics The lithium metal batteries (coin cells) prepared according to Reference Example 2 and Comparative Reference Example 2 were charged at a rate of 0.1 C in a constant current mode at 25° C. until a voltage reached 4.20 V (vs. Li) and cut off at a current of 0.05 C while maintaining the voltage of 4.20 V in a constant voltage mode. Next, the lithium metal batteries were discharged at a rate of 0.1 C in a constant current mode until the voltage reached 3.0 V (vs. Li) (formation, $1^{st}$ cycle). This charging and discharging process was further repeated twice to complete a formation process.

After formation, the lithium metal batteries were charged at a rate of 0.7 C in a constant current mode at room temperature (25° C.) until the voltage reached 4.20 V (vs Li) and discharged at a rate of 0.5 C in a constant current mode until the voltage reached a cut-off voltage of 4.20 V.

The charging and discharging process described above was further repeated 119 times. Thus, the charging and discharging process was repeated 120 times in total. A capacity retention ratio is calculated using Equation 1 below. Evaluation results of the capacity retention ratio are shown in FIG. 7A.

Capacity retention (%)=(discharge capacity at $100^{th}$ cycle/discharge capacity at $1^{st}$ cycle)×100%    Equation 1

Figure 7A:
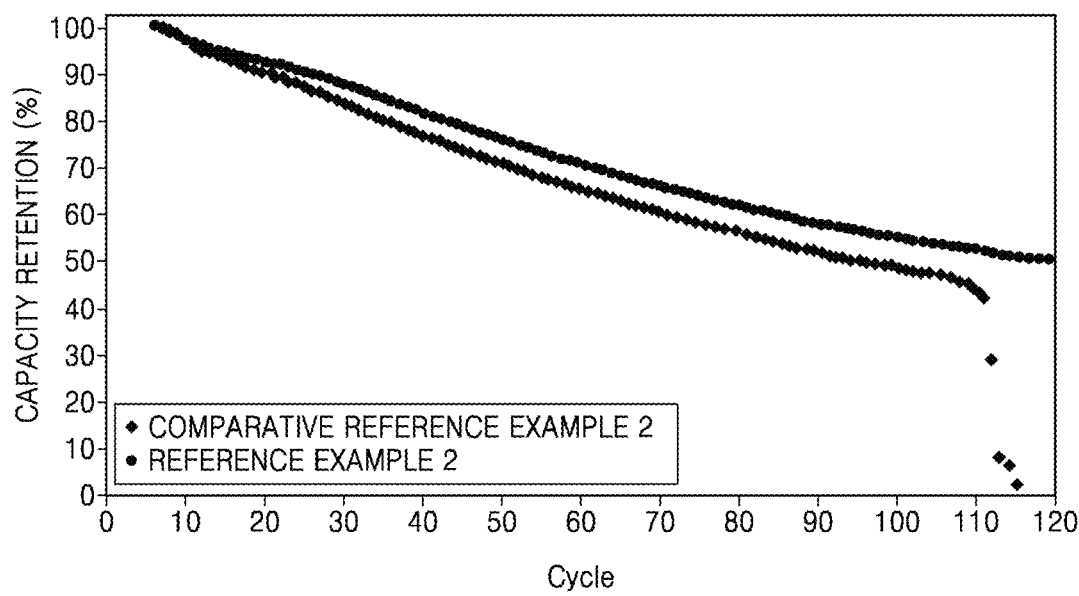
FIG. 7A is a graph of cycle number versus capacity retention (percent) illustrating lifespan characteristics of lithium metal batteries (coin cells) prepared according to Reference Example 2 and Comparative Reference Example 2.

Referring to FIG. 7A, the lithium metal battery (coin cell) prepared according to Reference Example 2 exhibited higher capacity retention ratio until $120^{th}$ cycle in comparison with the lithium metal battery (coin cell) prepared according to Comparative Reference Example 2.

1-2. Coulombic Efficiency

Coulombic efficiencies of the lithium metal batteries (coin cells) prepared according to Reference Example 2 and Comparative Reference Example 2 were measured at each cycle from $1^{st}$ to $100^{th}$ cycles under the same conditions for the evaluation of lifespan characteristics described above in operation 1-1. Coulombic efficiency may be calculated using Equation 2 below. Evaluation results of coulombic efficiency are shown in FIG. 7B.

Coulombic Efficiency (%)=(discharge capacity at $100^{th}$ cycle/charge capacity at $100^{th}$ cycle)×100%    Equation 2

Figure 7B:
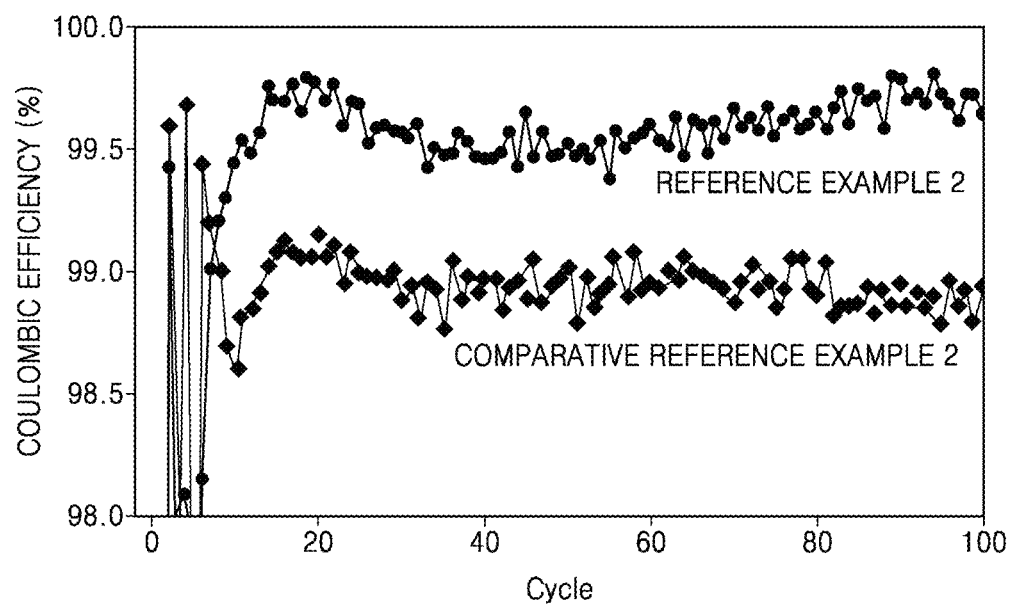
FIG. 7B is a graph of cycle number versus coulombic efficiency (percent) showing the columbic efficiency of lithium metal batteries (coin cells) prepared according to Reference Example 2 and Comparative Reference Example 2.

Referring to FIG. 7B, the lithium metal battery (coin cell) prepared according to Reference Example 2 exhibited higher coulombic efficiency until $100^{th}$ cycle in comparison with the lithium metal battery (coin cell) prepared according to Comparative Reference Example 2.

Evaluation Example 2: Evaluation of Impedance—Interfacial Resistance

Impedance properties of the lithium symmetric cells (pouch cells) prepared according to Example 3 and Comparative Example 4 were evaluated.

Figure 8:
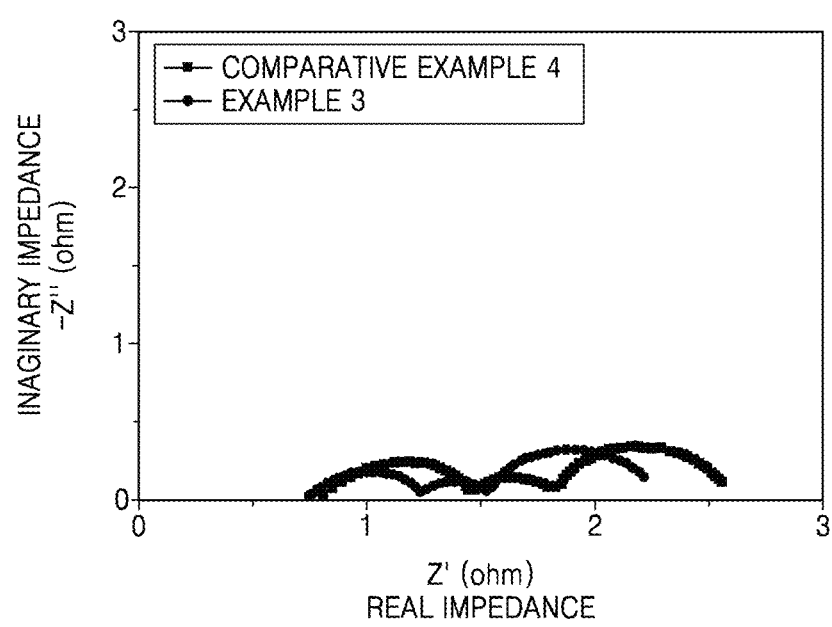
FIG. 8 is a graph of real impedance (Z', ohms) versus Imaginary Impedance (−Z", ohms) illustrating the impedance of lithium symmetric cells (pouch cells) prepared according to Example 3 and Comparative Example 4.

An impedance analyzer (Solatron SI1260 impedance/frequency analyzer, frequency range: 1 MHz to about 1 Hz, and amplitude: 10 mV) was used. A Nyquist plot that is a result of impedance measurement performed after maintaining an operating temperature of the lithium symmetric cells prepared according to Example 3 and Comparative Example 4 at 60° C. for 24 hours is shown in FIG. 8. In FIG. 8, interfacial resistance between the negative electrode and the electrolyte is determined by position and size of a semi-circle.

Referring to FIG. 8, the lithium symmetric cell (pouch cell) prepared according to Example 3 showed less interfacial resistance than the lithium symmetric cell (pouch cell) prepared according to Comparative Example 4.

Figure 9A:
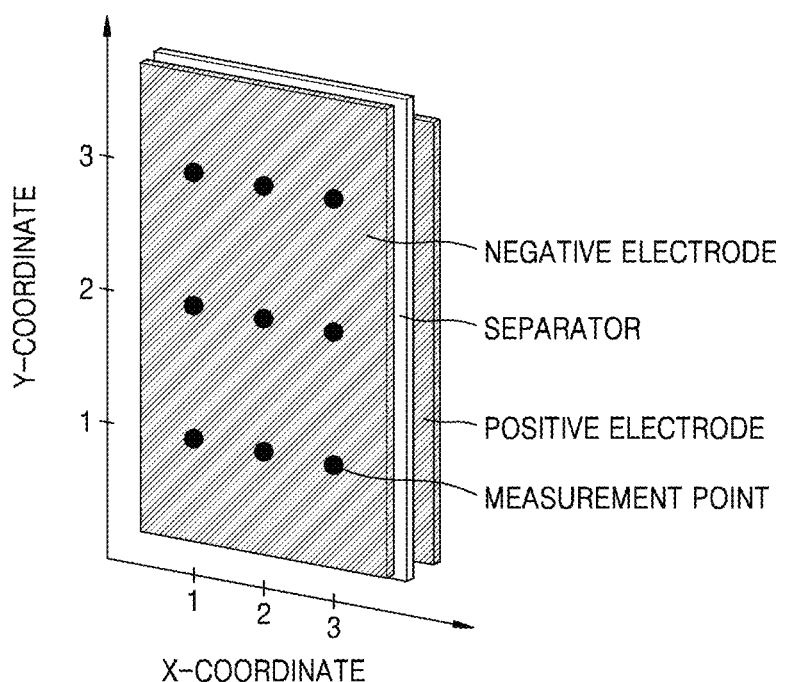
FIG. 9A is a schematic diagram illustrating 9 locations on an exterior of a pouch cell to evaluate thickness changes.

Evaluation Example 3: Electrodeposition Density of Lithium and Thickness Change 3-1. Electrodeposition Density of Lithium The lithium metal batteries (pouch symmetric cells) prepared according to Example 4 and Comparative Example 5 were disposed in a 4-point jig. The lithium metal batteries were charged at a rate of 0.1 C (0.3 mA/cm$^2$) at 25° C. in a constant current mode until a voltage reached 4.20 V (vs. Li) and the current was cut off at 0.05 C in a constant voltage mode while maintaining the voltage of 4.20 V. Next, the lithium metal batteries (pouch symmetric cells) were removed from the 4-point jig, and exterior thickness changes of the pouches were measured at 9 points marked in FIG. 9A by using a lithium micrometer. Electrodeposition density of lithium was calculated based thereon. Results thereof are shown in FIGS. 9B and 9C respectively.

Figure 9B:
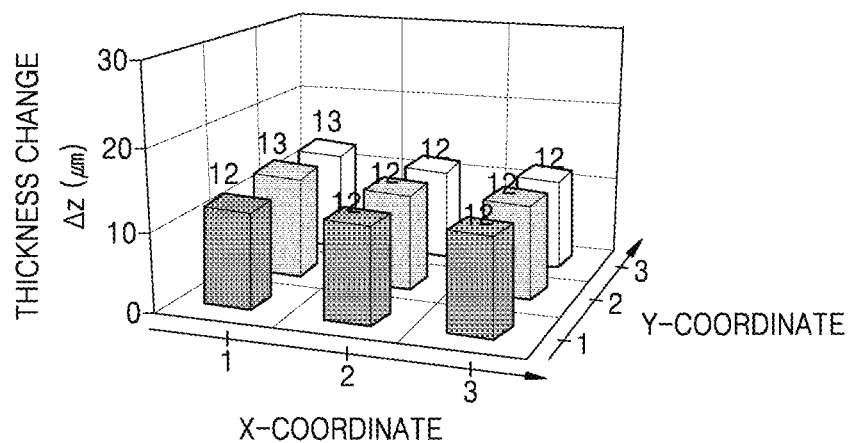
FIGS. 9B and 9C are graphs of coordinate (x and y as shown in FIG. 9A) and thickness change (ΔZ, micrometers) showing exterior thickness changes lithium metal batteries (pouch symmetric cells) prepared according to Example 4 and Comparative Example 5, respectively.

Referring to FIG. 9B, the lithium metal battery (pouch symmetric cell) prepared according to Example 4 showed a thickness change from about 12 to about 13 µm and an electrodeposition density of lithium from about 0.5 to about 0.53 g/cm$^3$.

Figure 9C:
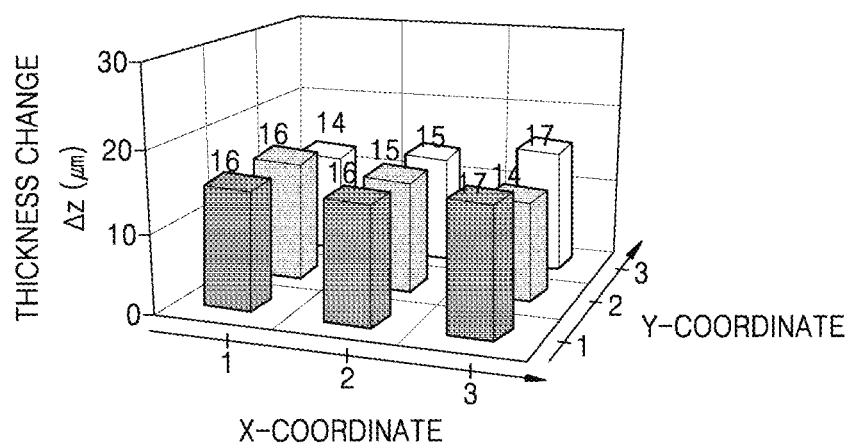

Referring to FIG. 9C, the lithium metal battery (pouch symmetric cell) prepared according to Comparative Example 5 showed an exterior thickness change from about 14 to about 17 µm and an electrodeposition density of lithium from about 0.49 to about 0.51 g/cm$^3$.

The lithium metal battery (pouch symmetric cell) prepared according to Example 4 exhibited a less exterior thickness change of the pouch and a greater electrodeposition density of lithium than the lithium metal battery (pouch cell) prepared according to Comparative Example 5.

3-2. Thickness Change of Cell According to Charging and Discharging Cycle

Lithium metal batteries (pouch symmetric cells) prepared according to Example 4, Reference Example 3, and Comparative Example 5 were charged at a rate of 0.1 C in a constant current mode at 25° C. until a voltage reached 4.20 V (vs. Li) and cut off at a rate of 0.05 C in a constant voltage mode while maintaining the voltage of 4.20 V. Next, the lithium metal batteries were discharged at a rate of 0.1 C in a constant current mode until the voltage reached 3.0 V (vs. Li). This charging and discharging process was further repeated to complete a formation process.

After formation, the lithium metal batteries were charged at a rate of 0.5 C in a constant current mode at room temperature (25° C.) until the voltage reached 4.20 V (vs Li) and discharged at a rate of 0.5 C in a constant current mode until the voltage reached a cut-off voltage of 4.20 V.

Figure 9D:
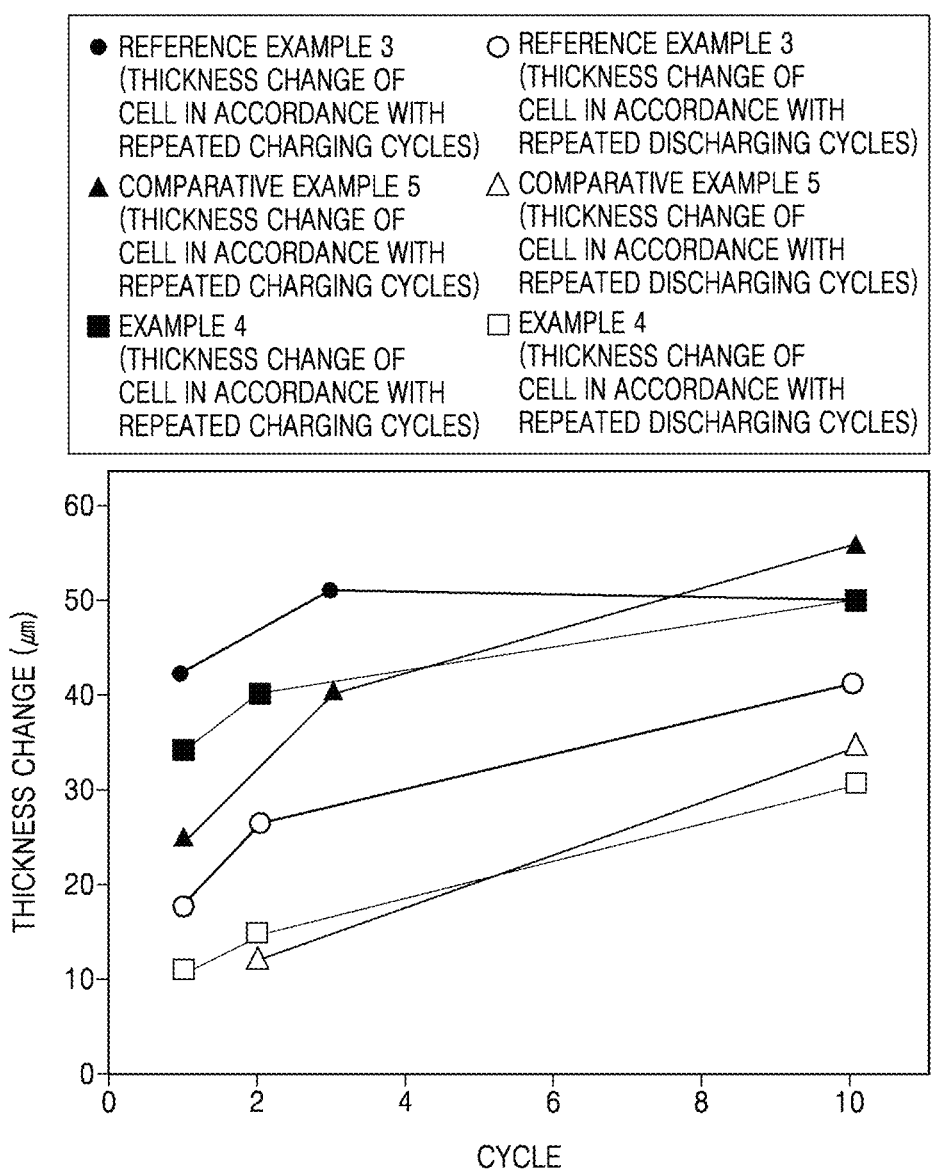
FIG. 9D is a graph of cycle number versus thickness change (micrometers, μm) illustrating cell thickness changes of lithium metal batteries (pouch symmetric cells) prepared according to Example 4, Reference Example 3, and Comparative Example 5 with respect to charging and discharging cycles.

The charging and discharging process described above was further repeated 10 times in total. Results of monitoring thickness changes of cells in accordance with repeated charging and discharging cycles are shown in FIG. 9D.

The lithium metal batteries (pouch symmetric cells) prepared according to Example 4 and Reference Example 3 exhibited a less cell thickness change than the lithium metal battery (pouch symmetric cell) prepared according to Comparative Example 5.

The negative electrode for a metal battery and the metal battery including the same may have excellent thermal stability and mechanical properties simultaneously with high ionic conductivity. In addition, the negative electrode and the metal battery including the same may have excellent charging and discharging characteristics such as coulombic efficiency and lifespan characteristics. Since the protective layer forming composition is applied in-situ on the metal substrate and dried according to the method of preparing the negative electrode for a metal battery, side reactions with the electrolyte may further be inhibited.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A negative electrode for a metal battery, the negative electrode comprising:
    a metal substrate; and
    a protective layer disposed directly on at least a portion of the metal substrate,
    wherein the protective layer comprises an ion-conductive oligomer,
    wherein the ion-conductive oligomer comprises an ion-conductive structural unit in at least one of a main chain and a side chain of the ion-conductive oligomer, and at least two hydrogen-bond-forming functional groups at different ends of the ion-conductive oligomer,
    wherein the ion-conductive oligomer is represented by Formula 1 below and has a weight average molecular weight of about 100 grams per mole to about 5000 grams per mole:

Formula 1

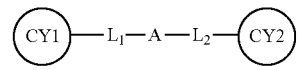

wherein in Formula 1,
CY1 and CY2 are each independently a substituted or unsubstituted pyrimidinone, a substituted or unsubstituted pyrimidinol, a substituted or unsubstituted pyrimidine, a substituted or unsubstituted purinone, or a combination thereof,
A is a C1-C30 alkylene oxide group, —{Si(R)(R$_1$)—O-}$_b$—, or —(CH$_2$CH$_2$O)$_a$-{Si(R)(R$_1$)—O-}$_b$—, wherein R and R$_1$ are each independently a hydrogen atom or a C1-C10 alkyl group and a and b are each independently an integer from 1 to 10,
L$_1$ and L$_2$ are each independently a single bond, —CO—, —C(O)O—, —CO—(R')—CO—, —C(O)O—(R'$_1$)—C(O)O—, —CO—(R'$_2$)—C(O)O—, —C(O)O—(R'$_3$)—CO—, —(R'$_4$)—NHCO—, —(R'$_5$)—NHC(O)O—, —(R'$_6$)—NHC(O)O—(R'$_7$), —NCO—(R'$_8$)—NCO—, —NCO—(R'$_9$)—CO—, —NCO—(R'$_{10}$)—C(O)O—, —CO—(R'$_{11}$)—NCO—, —C(O)O—(R'$_{12}$)—NCO—, or a combination thereof, wherein R', R'$_1$, R'$_2$, R'$_3$, R'$_4$, R'$_5$, R'$_6$, R'$_7$, R'$_8$, R'$_9$, R'$_{10}$, R'$_{11}$, and R'$_{12}$ are each independently a C1-C10 alkylene group, an amino group, or a C1-C10 aminoalkylene group, $L_1$ is linked to a substituent of CY1, $L_2$ is linked to a substituent of CY2, and wherein the protective layer has a thickness of 5 micrometers or less.

2. The negative electrode of claim 1, wherein the protective layer is a solid protective layer.

3. The negative electrode of claim 1, wherein a Young's modulus of the protective layer is 50 megapascals or greater.

4. The negative electrode of claim 1, wherein a melting point of the protective layer is greater than 60° C.

5. The negative electrode of claim 1, wherein the main chain or the side chain of the ion-conductive oligomer is a C1-C30 alkylene oxide group, —{Si(R)(R$_1$)—O-}—, —(CH$_2$CH$_2$O)—{Si(R)(R$_1$)—O—}—, or —{CH(R$_2$)C(R$_3$)C(O)O(R$_4$)}—, wherein R, R$_1$, R$_2$, R$_3$, and R$_4$ are each independently a hydrogen atom or a C1-C10 alkyl group.

6. The negative electrode of claim 1, wherein the ion-conductive structural unit is a C1-C20 alkylene oxide group, —{Si(R)(R$_1$)—O-}—, or —(CH$_2$CH$_2$O)—{Si(R)(R$_1$)—O-}—, wherein R and R$_1$ are each independently a hydrogen atom or a C1-C10 alkyl group.

7. The negative electrode of claim 1, wherein the hydrogen-bond-forming functional group is a substituted or unsubstituted pyrimidinone, a substituted or unsubstituted pyrimidinol, a substituted or unsubstituted pyrimidine, a substituted or unsubstituted triazine, a substituted or unsubstituted pyridyl, a substituted or unsubstituted benzimidazole, a substituted or unsubstituted naphthyridine, a substituted or unsubstituted purinone, or a combination thereof.

8. The negative electrode of claim 1, wherein CY1 and CY2 are each substituted with a —NH$_2$ group, wherein $L_1$ and $L_2$ are each independently linked to an —NH$_2$ substituent of CY1 and CY2.

9. The negative electrode of claim 1, wherein CY1 and CY2 are each independently represented by Formula 2, Formula 3, or Formula 4:

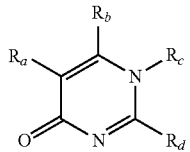

Formula 2 wherein, in Formula 2,

R$_a$, R$_b$, R$_c$, and R$_d$ are each independently a hydrogen atom, a halogen atom, a cyano group, a hydroxyl group, —NH$_2$, —C(O)R", —C(O)OR", —OCO(OR"), —C═N(R"), a substituted or unsubstituted C1-C10 alkyl group, a substituted or unsubstituted C1-C10 alkoxy group, a substituted or unsubstituted C2-C10 alkenyl group, a substituted or unsubstituted C2-C10 alkynyl group, a C2-C10 alkylene oxide group, a substituted or unsubstituted C3-C20 cycloalkyl group, a substituted or unsubstituted C6-C20 aryl group, a substituted or unsubstituted C6-C20 aryloxy group, a substituted or unsubstituted C6-C20 heteroaryl group, or a combination thereof, wherein R" is a hydrogen atom, a C1-C10 alkyl group, or a C6-C20 aryl group, and at least one of R$_a$, R$_b$, R$_c$, and R$_d$ is —NH$_2$,

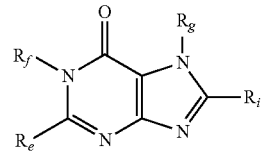

Formula 3 wherein, in Formula 3,

R$_e$, R$_f$, R$_g$, and R$_i$ are each independently a hydrogen atom, a halogen atom, a cyano group, a hydroxyl group, —NH$_2$, —C(O)R", —C(O)OR", —OCO(OR"), —C═N(R"), a substituted or unsubstituted C1-C10 alkyl group, a substituted or unsubstituted C1-C10 alkoxy group, a substituted or unsubstituted C2-C10 alkenyl group, a substituted or unsubstituted C2-C10 alkynyl group, a C2-C10 alkylene oxide group, a substituted or unsubstituted C3-C20 cycloalkyl group, a substituted or unsubstituted C6-C20 aryl group, a substituted or unsubstituted C6-C20 aryloxy group, a substituted or unsubstituted C6-C20 heteroaryl group, or a combination thereof, wherein R" is a hydrogen atom, a C1-C10 alkyl group, or a C6-C20 aryl group, and at least one of R$_e$, R$_f$, R$_g$, and R$_i$ is —NH$_2$,

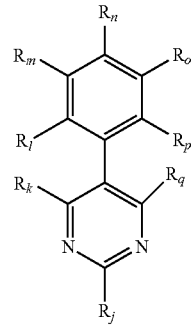

Formula 4 wherein, in Formula 4,

R$_j$, R$_k$, R$_l$, R$_m$, R$_n$, R$_o$, R$_p$, and R$_q$ are each independently a hydrogen atom, a halogen atom, a cyano group, a hydroxyl group, —NH$_2$, —C(O)R", —C(O)OR", —OCO(OR"), —C═N(R"), a substituted or unsubstituted C1-C10 alkyl group, a substituted or unsubstituted C1-C10 alkoxy group, a substituted or unsubstituted C2-C10 alkenyl group, a substituted or unsubstituted C2-C10 alkynyl group, a C2-C10 alkylene oxide group, a substituted or unsubstituted C3-C20 cycloalkyl group, a substituted or unsubstituted C6-C20 aryl group, a substituted or unsubstituted C6-C20 aryloxy group, a substituted or unsubstituted C6-C20 heteroaryl group, or a combination thereof, wherein R" is a hydrogen atom, a C1-C10 alkyl group, or a C6-C20 aryl group, and at least one of R$_j$, R$_k$, R$_l$, R$_m$, R$_n$, R$_o$, R$_p$, and R$_q$ is —NH$_2$.

10. The negative electrode of claim 1, wherein a radius of gyration of the ion-conductive oligomer is 3 nanometers or less.

11. The negative electrode of claim 1, wherein the protective layer further comprises a lithium salt.

12. The negative electrode of claim 11, wherein the lithium salt comprises LiSCN, LiN(CN)$_2$, LiClO$_4$, LiI, LiBF$_4$, LiAsF$_6$, LiPF$_6$, LiCF$_3$SO$_3$, LiC(CF$_3$SO$_2$)$_3$, LiN(SO$_2$C$_2$F$_5$)$_2$, LiN(SO$_2$CF$_3$)$_2$, LiN(SO$_2$F)$_2$, LiSbF$_6$, LiPF$_3$(CF$_2$CF$_3$)$_3$, LiPF$_3$(CF$_3$)$_3$, LiB(C$_2$O$_4$)$_2$, or a combination thereof.

13. The negative electrode of claim 1, wherein the protective layer further comprises an organic particle, an inorganic particle, an organic-inorganic particle, or combination thereof, each having a particle diameter greater than 1 micrometer and equal to or less than 100 micrometers.

14. The negative electrode of claim 13, wherein the particle comprises polystyrene, a copolymer comprising a styrene repeating unit, a copolymer comprising a repeating unit having a crosslinkable functional group, a crosslinked polymer, or a combination thereof.

15. A metal battery comprising:
a positive electrode;
the negative electrode according to claim 1; and
an electrolyte disposed between the positive electrode and the negative electrode.

16. The metal battery of claim 15, wherein the electrolyte comprises a liquid electrolyte, a solid electrolyte, a gel electrolyte, a polymeric ionic liquid, or a combination thereof.

17. The metal battery of claim 16, wherein the liquid electrolyte comprises a lithium salt and an organic solvent.

18. The metal battery of claim 17, wherein the lithium salt has a concentration of about 0.1 molar to about 4 molar.

19. The metal battery of claim 17, wherein the organic solvent comprises ethylene carbonate, propylene carbonate, dimethyl carbonate, diethyl carbonate, ethylmethyl carbonate, fluoroethylene carbonate, gamma-butyro lactone, dimethoxyethane, diethoxyethane, diethylene glycol dimethyl ether, triethylene glycol dimethyl ether, tetraethylene glycol dimethyl ether, polyethylene glycol dimethyl ether, succinonitrile, sulforane, dimethyl sulfone, ethylmethyl sulfone, diethyl sulfone, adiponitrile, tetraethylene glycol dimethyl ether, 1,1,2,2-tetrafluoroethyl 2,2,3,3-tetrafluoropropyl ether, or a combination thereof.

20. The metal battery of claim 15, wherein an electrodeposition density of lithium in the metal battery is from about 0.5 grams per cubic centimeter to about 0.53 grams per cubic centimeter.

21. The metal battery of claim 15, wherein the protective layer of the negative electrode has an average thickness deviation of about 0.1 micrometer to about 2 micrometers.

22. The metal battery of claim 15, further comprising a separator.

23. A method of preparing a negative electrode for a metal battery, the method comprising:
providing a protective layer forming composition comprising an ion-conductive oligomer;
applying, on at least a portion of a metal substrate, the protective layer forming composition to form a coating; and
drying the coating to prepare the negative electrode of claim 1.

* * * * *